(12) United States Patent
Heeter et al.

(10) Patent No.: US 10,473,030 B2
(45) Date of Patent: Nov. 12, 2019

(54) ACOUSTIC PANEL OF TURBINE ENGINE

(71) Applicant: Rolls-Royce Corporation, Indianapolis, IN (US)

(72) Inventors: Robert W. Heeter, Noblesville, IN (US); Jonathan Rivers, Indianapolis, IN (US); Dennes Kyle Burney, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 241 days.

(21) Appl. No.: 15/452,341

(22) Filed: Mar. 7, 2017

(65) Prior Publication Data
US 2018/0258852 A1  Sep. 13, 2018

(51) Int. Cl.
| | |
|---|---|
| *F02C 7/045* | (2006.01) |
| *B64D 33/02* | (2006.01) |
| *F02K 1/82* | (2006.01) |
| *F04D 29/66* | (2006.01) |

(52) U.S. Cl.
CPC .............. *F02C 7/045* (2013.01); *B64D 33/02* (2013.01); *B64D 2033/0206* (2013.01); *F02K 1/827* (2013.01); *F04D 29/664* (2013.01); *F05D 2260/30* (2013.01); *F05D 2260/31* (2013.01); *F05D 2260/96* (2013.01); *Y02T 50/672* (2013.01)

(58) Field of Classification Search
CPC . F02C 7/045; B64D 33/02; B64D 2033/0206; B64D 2033/0286; F02K 1/827; F04D 29/664; F05D 2260/30; F05D 2260/31; F05D 2260/96; Y02T 50/672

USPC ........................................................... 181/214
See application file for complete search history.

(56) References Cited

U.S. PATENT DOCUMENTS

| | | | | |
|---|---|---|---|---|
| 3,568,790 | A * | 3/1971 | Sankey | B64F 1/26 137/15.1 |
| 6,761,245 | B2 * | 7/2004 | Porte | F02C 7/045 181/210 |
| 6,920,958 | B2 | 7/2005 | Harrison | |
| 7,866,440 | B2 * | 1/2011 | Douglas | B64D 33/02 181/210 |

(Continued)

FOREIGN PATENT DOCUMENTS

| | | |
|---|---|---|
| EP | 1 860 283 A2 | 11/2007 |
| EP | 2 105 597 A2 | 9/2009 |

(Continued)

OTHER PUBLICATIONS

European Search Report for European Application No. EP 18155523, dated Jul. 19, 2018 (7 pages).

*Primary Examiner* — Forrest M Phillips
(74) *Attorney, Agent, or Firm* — McCracken & Gillen LLC

(57) ABSTRACT

An aircraft engine includes a rotating structure and a casing circumferentially surrounding the rotating structure. The aircraft engine further includes an acoustic panel for noise reduction circumferentially surrounding the rotating structure. The acoustic panel is disposed proximal the casing. Furthermore, the acoustic panel includes a plurality of acoustic panel members. In addition, the acoustic panel is secured to the casing by at least one securement mechanism such that the acoustic panel is substantially circumferentially fixed relative to the casing.

17 Claims, 21 Drawing Sheets

(56) References Cited

U.S. PATENT DOCUMENTS

| | | | |
|---|---|---|---|
| 7,866,939 B2 * | 1/2011 | Harper | B64D 33/02 |
| | | | 415/119 |
| 7,967,108 B2 | 6/2011 | Harper | |
| 9,016,042 B2 * | 4/2015 | Chiou | F02K 1/60 |
| | | | 137/15.1 |
| 2004/0045766 A1 * | 3/2004 | Porte | F02C 7/045 |
| | | | 181/210 |
| 2008/0069688 A1 * | 3/2008 | Harper | F01D 21/045 |
| | | | 415/196 |
| 2011/0142615 A1 | 6/2011 | Riou et al. | |

FOREIGN PATENT DOCUMENTS

| | | |
|---|---|---|
| EP | 2 305 984 A2 | 4/2011 |
| EP | 2 305 984 A3 | 8/2012 |
| EP | 1 860 283 A3 | 9/2013 |
| EP | 2 105 597 A3 | 3/2015 |
| GB | 2 407 344 A | 4/2005 |
| GB | 2 429 043 A | 2/2007 |

* cited by examiner

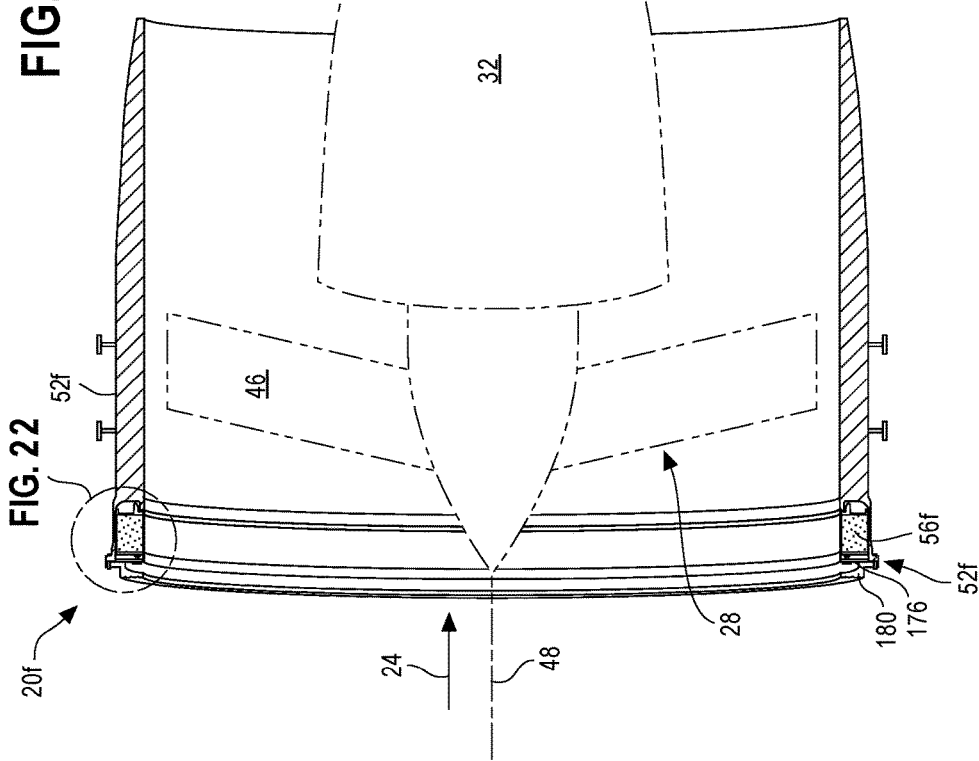

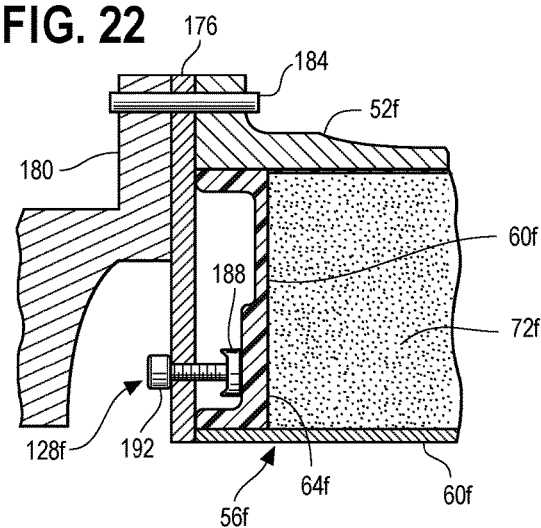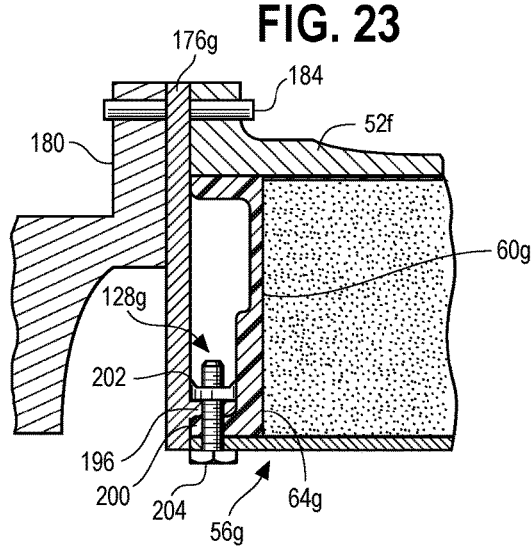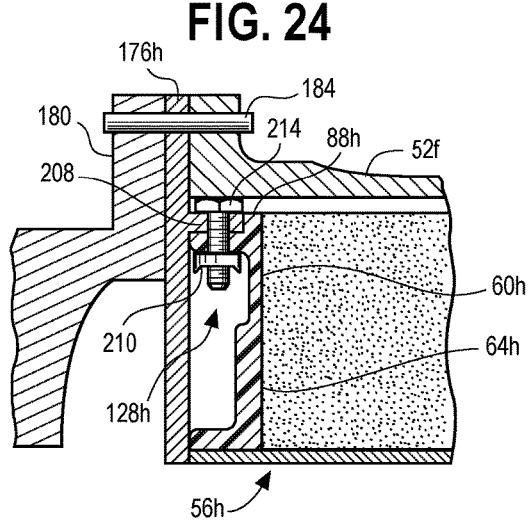

ACOUSTIC PANEL OF TURBINE ENGINE

FIELD OF DISCLOSURE

The present subject matter relates to turbomachines and acoustic panels for noise reduction.

BACKGROUND

An aircraft engine or other turbomachine may produce noise during operation and this may be an inconvenience for pilots or passengers of an aircraft. Also, the noise may be an inconvenience for residential neighborhoods located near airports. To minimize this inconvenience, turbine engines may include an acoustic panel for noise mitigation. In certain contexts, improving the securement of the acoustic panel to the rest of the aircraft engine may be desirable. This may be desirable in aircraft engines that have metallic fan casings as well as aircraft engines that have composite fan casings. Additionally, improving ease of installation and ease of repair of the acoustic panel may also be desirable.

SUMMARY

According to one aspect, an aircraft engine includes a rotating structure and a casing circumferentially surrounding the rotating structure. The aircraft engine further includes an acoustic panel for noise reduction circumferentially surrounding the rotating structure. The acoustic panel is disposed proximal the casing. Furthermore, the acoustic panel includes a plurality of acoustic panel members. In addition, the acoustic panel is secured to the casing by at least one securement mechanism such that the acoustic panel is substantially circumferentially fixed relative to the casing.

According to another aspect, a turbine engine includes a fan and a fan casing circumferentially surrounding the fan. The turbine engine further includes an acoustic panel for noise reduction circumferentially surrounding the fan. The acoustic panel includes a plurality of acoustic panel members arranged adjacent to one another to form a substantially complete ring of the acoustic panel. A first acoustic panel member of the plurality of acoustic panel members is adjacent to a second acoustic panel member of the plurality of acoustic panel members. Furthermore, the first acoustic panel member is removably secured to the second acoustic panel member by a releasable fastening assembly. The turbine engine further includes a securement mechanism that secures the acoustic panel to the fan casing such that the acoustic panel is substantially circumferentially fixed relative to the fan casing.

According to yet another aspect, an aircraft engine includes a rotating structure disposed proximal a forward end of the aircraft engine. The aircraft engine further includes a composite casing circumferentially surrounding the rotating structure. The aircraft engine further includes a securement ring circumferentially surrounding the rotating structure and fastened to the composite casing. The aircraft engine further includes an acoustic panel surrounding the rotating structure and disposed radially inside the composite casing. The acoustic panel is secured to the securement ring by a securement mechanism such that the acoustic panel is substantially circumferentially fixed relative to the composite casing.

Other aspects and advantages will become apparent upon consideration of the following detailed description and the attached drawings wherein like numerals designate like structures throughout the specification.

BRIEF DESCRIPTION OF THE DRAWINGS

FIG. 21 is a schematic cross-sectional view of a composite fan casing and an acoustic panel of a gas turbine engine, with the remainder of the gas turbine engine shown in environment, wherein the acoustic panel is configured to be circumferentially secured with respect to the fan casing by a securement ring;

FIG. 22 is an enlarged cross-sectional view of the portion of FIG. 21 indicated by line 22 of FIG. 21, showing a first embodiment of the securement ring;

FIG. 23 is an enlarged cross-sectional view of a second embodiment of the securement ring;

FIG. 24 is an enlarged cross-sectional view of a third embodiment of the securement ring.

DETAILED DESCRIPTION

Figure 1:
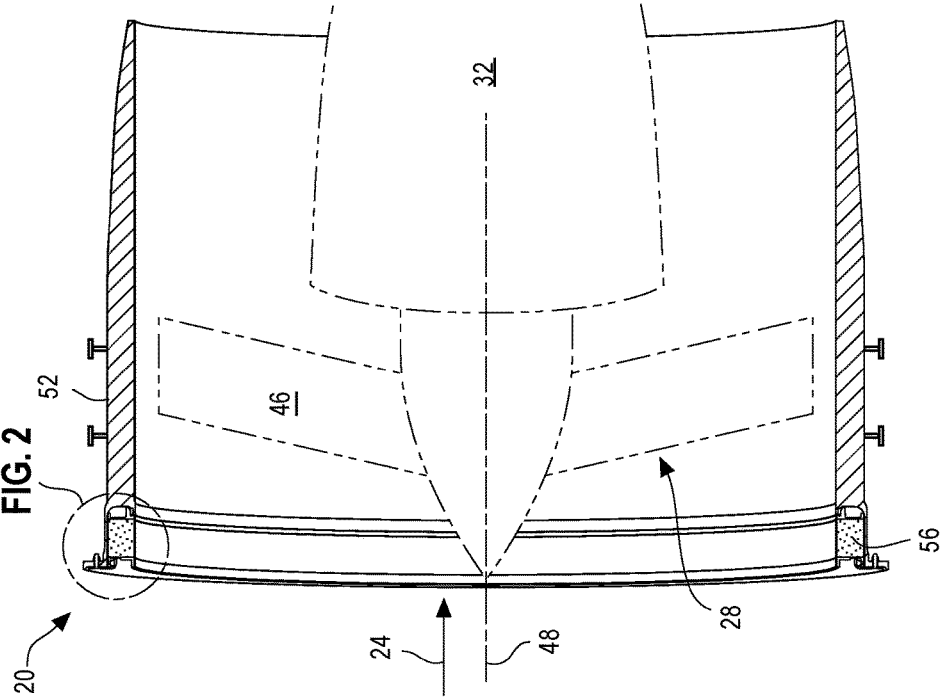
FIG. 1 is a schematic cross-sectional view of a fan casing and a prior art acoustic panel of a gas turbine engine, with the remainder of the gas turbine engine shown in environment.

Referring now to FIG. 1, an exemplary aircraft engine in the form of a gas turbine engine 20 includes an intake 24, a fan 28, a compressor 32, a combustion chamber 36 that receives compressed air from the compressor 32, a turbine 40 that converts rapidly expanding fuel and air into rotary motive power, and an exhaust 44. The fan 28 includes a plurality of fan blades 46 and rotates about a central longitudinal axis 48 of the turbine engine 20. As further shown in FIG. 1, the turbine engine 20 includes a fan casing 52 that circumferentially surrounds the fan 28. The fan 28 is an example of a rotating structure.

Figure 2:
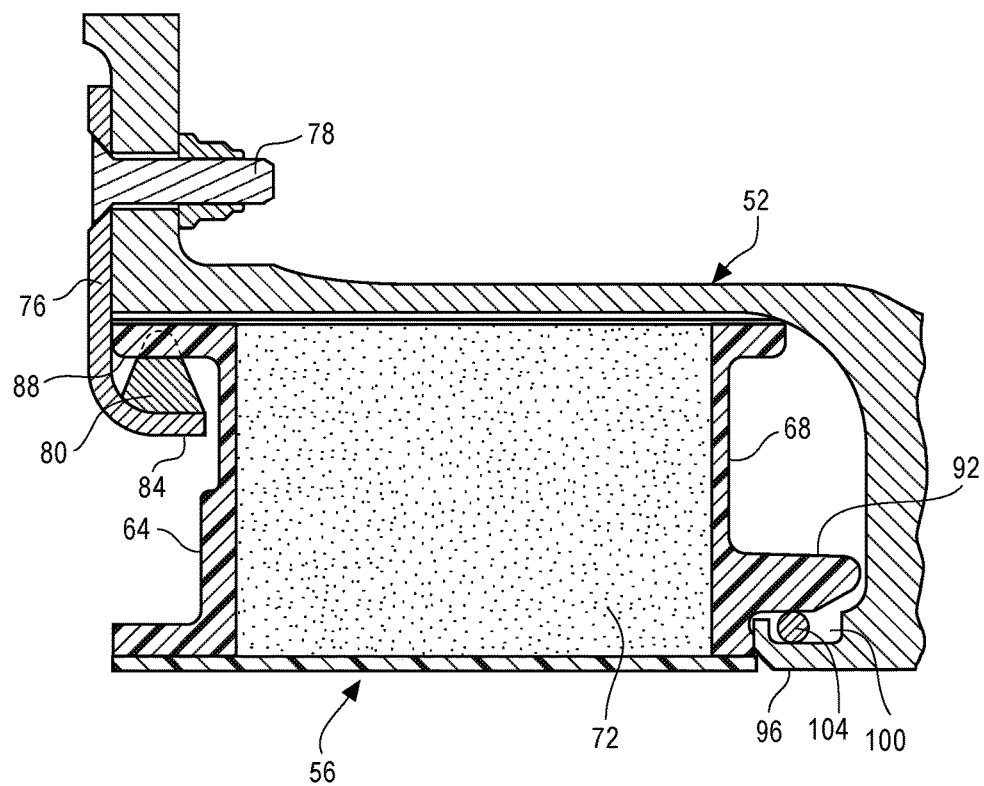
FIG. 2 is an enlarged cross-sectional view of the portion of FIG. 1 indicated by line 2 of FIG. 1.
Figure 3:
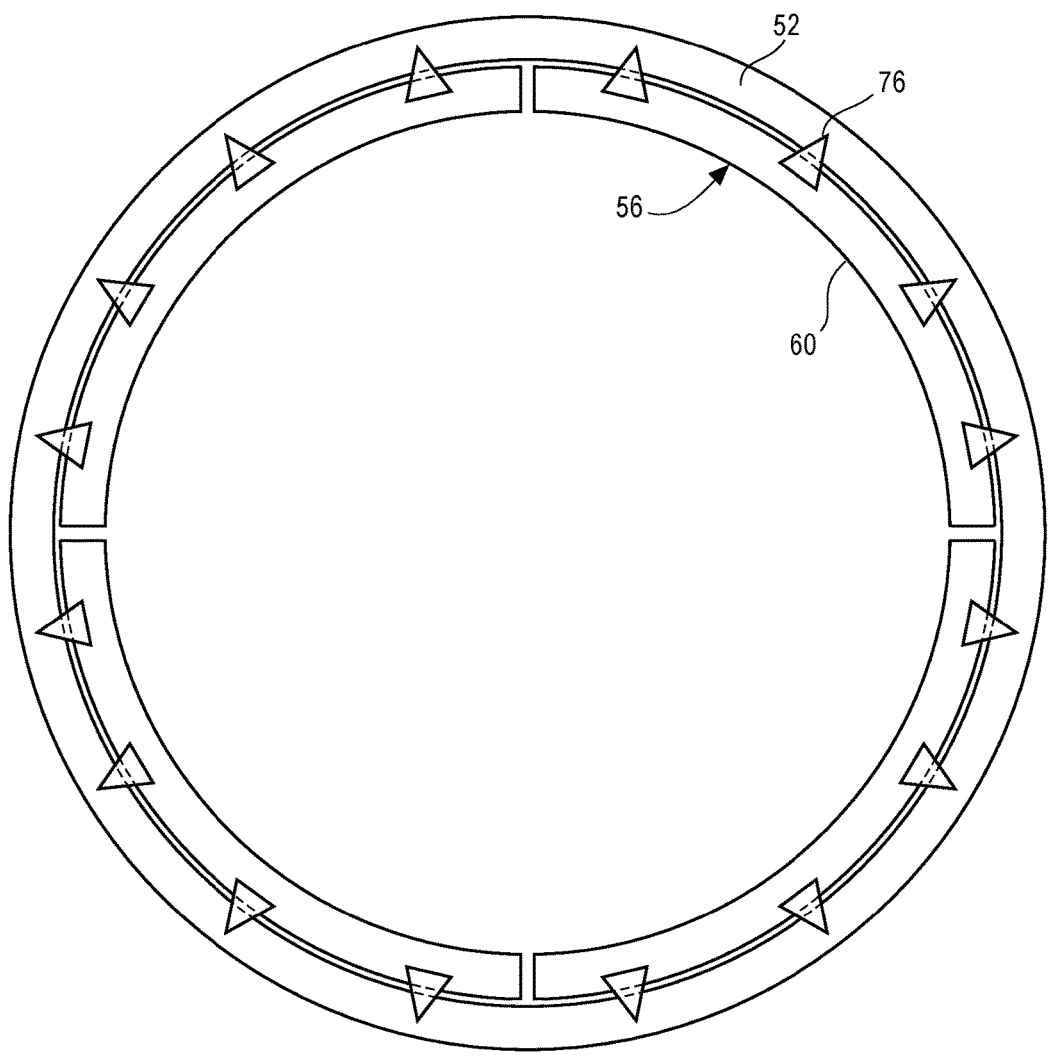
FIG. 3 is a schematic front elevational view of an acoustic panel and a fan casing of the gas turbine engine, as known in the art.

As further shown in FIG. 1, the turbine engine 20 further comprises a front acoustic panel 56 that is disposed adjacent the fan casing 52 and forward of the fan blades 46. It should be noted that the front acoustic panel 56, as depicted in FIGS. 1-3, is already known in the art. As shown in FIG. 3, the front acoustic panel 56 includes four acoustic panel members 60 that together form a substantially complete ring (or annulus) that is enclosed by the fan casing 52. Each acoustic panel member 60 interfaces with the fan casing 52 as shown in FIG. 2.

As further shown in FIG. 2, each acoustic panel member 60 includes a forward rail 64, an aft rail 68, and honeycomb acoustic material 72 disposed therebetween. The forward rail 64 interfaces with a bracket 76 that is secured to the fan casing 52 by a horizontal fastener 78, as further shown in FIG. 2. The bracket 76 includes cones 80 extending upward from a bottom lip 84 of the bracket 76. The cones 80 are nestled in an upper lip 88 of the forward rail 64. Moreover, the bottom lip 84 of the bracket 76 is positioned below the upper lip 88 such that it interferes with downward movement of the forward rail 64. As further shown in FIG. 3, each acoustic panel member 60 interfaces with four brackets 76 in this manner. The four brackets 76 of each acoustic panel member 60 are secured to the fan casing 52, for a total of sixteen brackets 76, as shown in FIG. 3.

As further shown in FIG. 2, the aft rail 68 includes an aft protrusion 92 that protrudes in the aft direction and is disposed above a forward protrusion 96 of the fan casing 52. The forward protrusion 96 includes a recess 100 in which an O-ring 104 is positioned. The O-ring 104 is disposed between the forward protrusion 96 of the fan casing 52 and the aft protrusion 92 of the aft rail 68.

In certain situations, it is advantageous to improve the securement of the front acoustic panel 56 to the fan casing 52. Such improved securement may be provided using a full hoop front acoustic panel 56 but one disadvantage with a full hoop front acoustic panel 56 is that it may be inconvenient to manufacture, install, repair, or replace in certain contexts. Therefore, there exists a need for an acoustic panel 56 that has improved securement to the fan casing 52 and is convenient to install, repair or replace.

Figure 4:
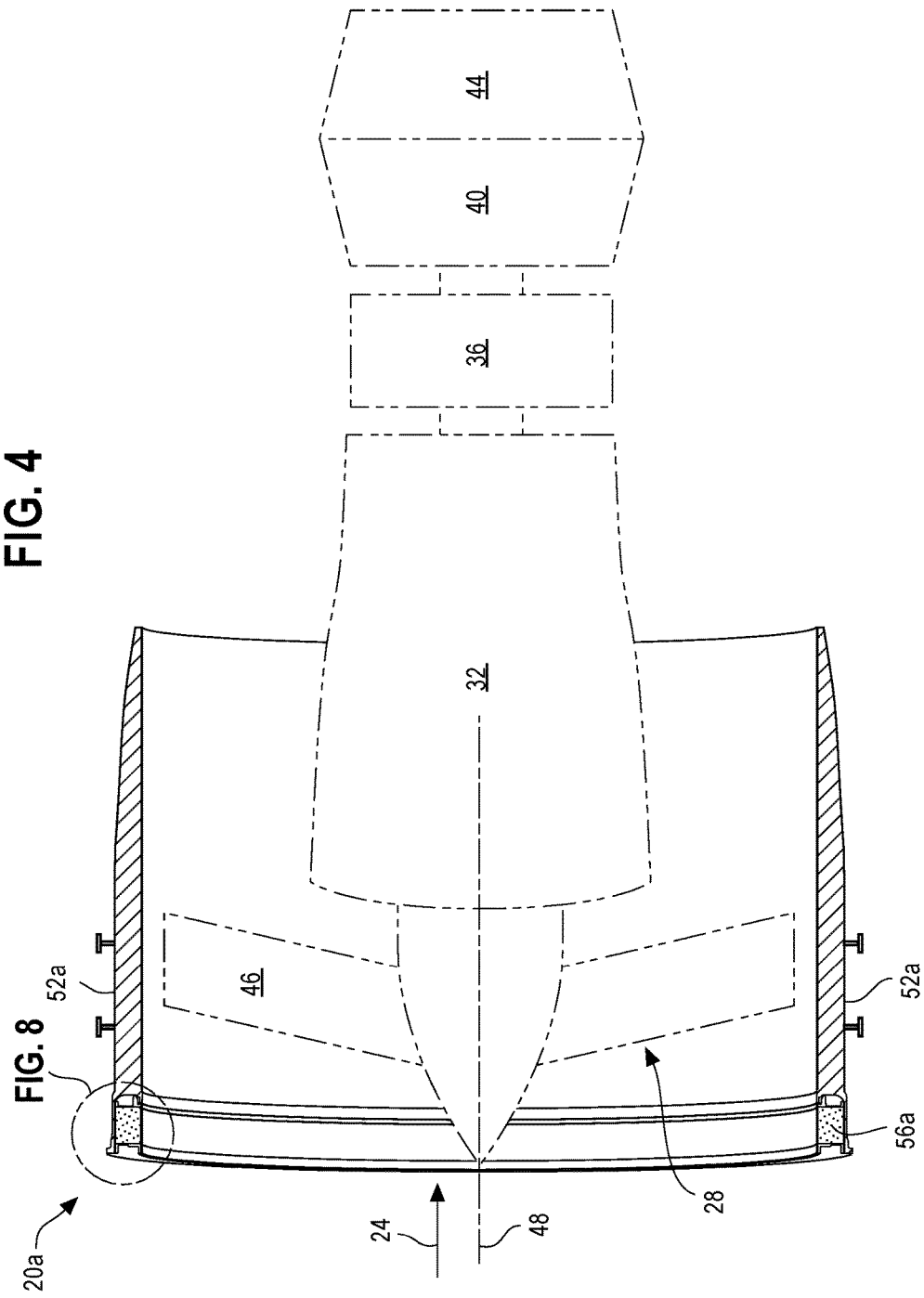
FIG. 4 is a schematic cross-sectional view of a fan casing and an acoustic panel of a gas turbine engine, with the remainder of the gas turbine engine shown in environment, wherein the acoustic panel is circumferentially secured with respect to the fan casing by a securement mechanism.

Referring now to FIG. 4, an exemplary aircraft engine in the form of a gas turbine engine 20a includes an intake 24, a fan 28, a compressor 32, a combustion chamber 36 that receives compressed air from the compressor 32, a turbine 40 that converts rapidly expanding fuel and air into rotary motive power, and an exhaust 44. The fan 28 includes a plurality of fan blades 46 and rotates about a central longitudinal axis 48 of the turbine engine 20a. The fan 28 may be disposed near a forward end of the engine 20a, as further shown in FIG. 4. As further shown in FIG. 4, the turbine engine 20a includes a fan casing 52a that circumferentially surrounds the fan 28. The fan 28 is an example of a rotating structure and the fan casing 52a is an example of a stationary structure of the aircraft engine 20a.

Figure 5:
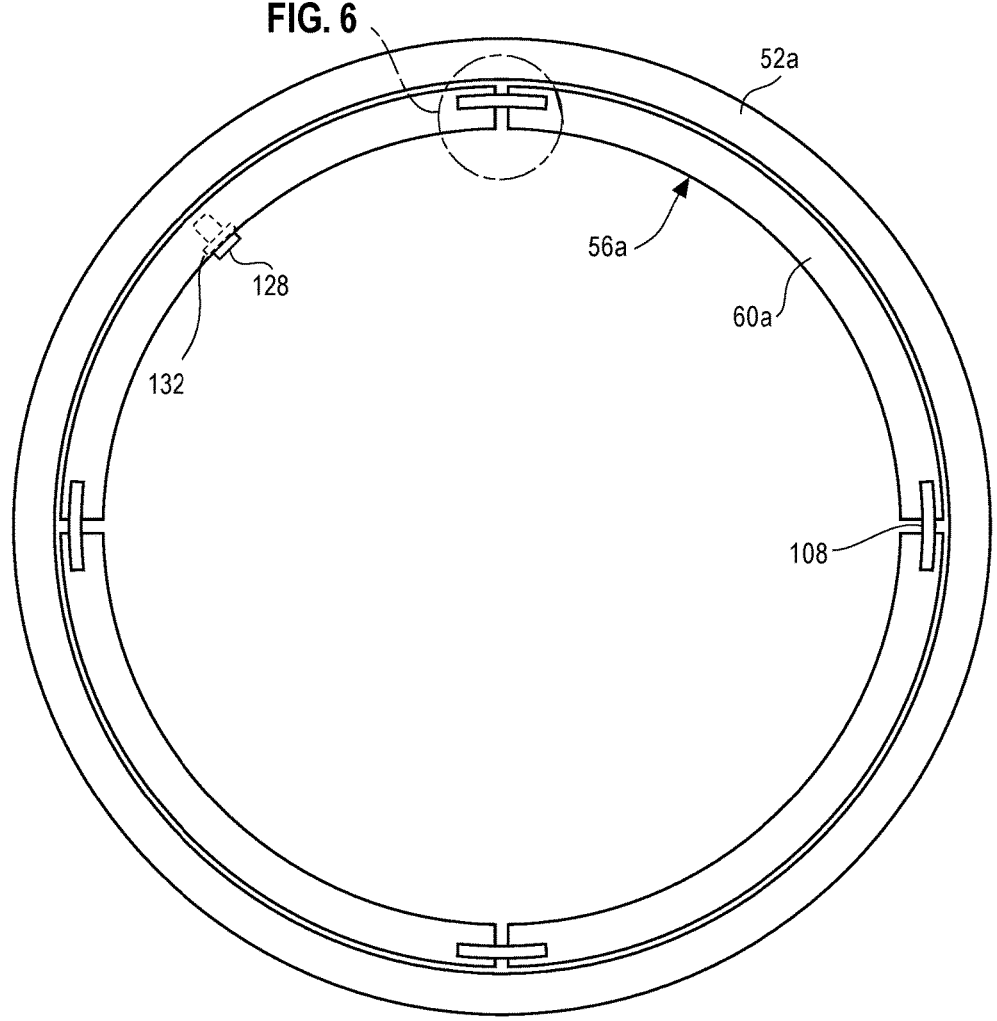
FIG. 5 is a schematic front elevational view of the acoustic panel and the fan casing.
Figure 7:
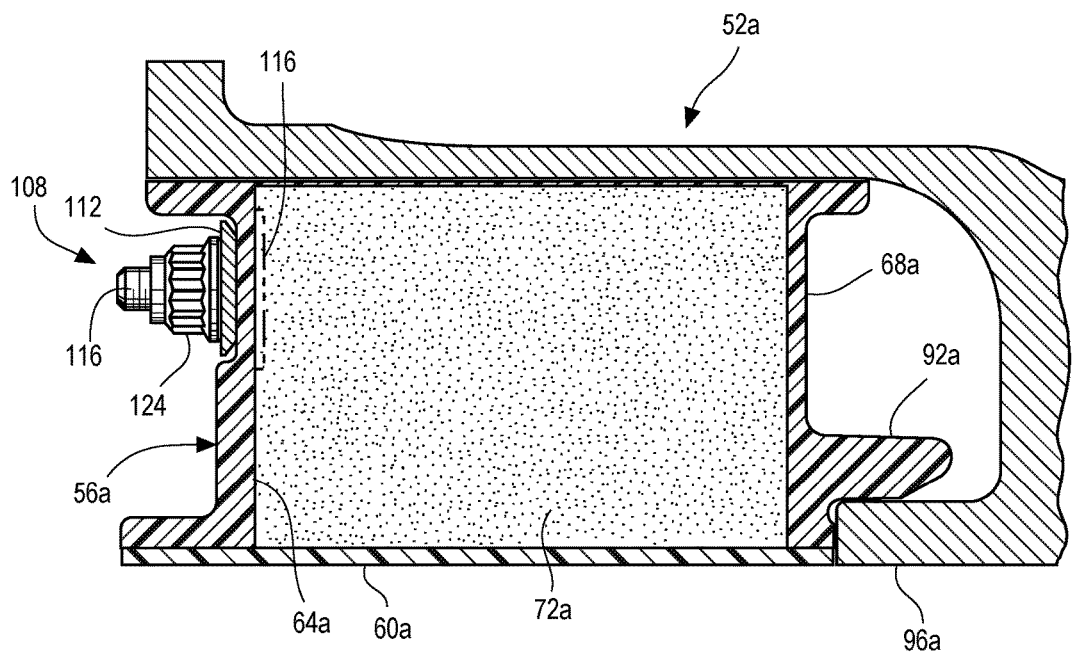
FIG. 7 is a cross-sectional view of the acoustic panel and the fan casing taken along lines 7-7 of FIG. 6.

As further shown in FIG. 4, the turbine engine 20a further comprises a front acoustic panel 56a that is disposed adjacent the fan casing 52a and forward of the fan blades 46. As further shown in FIG. 5, the front acoustic panel 56a is enclosed by the fan casing 52a. The front acoustic panel 56a is for noise reduction and circumferentially surrounds a rotating structure such as the fan 28, as shown in FIG. 4. Moreover, the front acoustic panel 56a is disposed radially inside the fan casing 52a, as shown in FIG. 5. Referring again to FIG. 5, the front acoustic panel 56a has four (or some other plurality of) acoustic panel members 60a that are arranged adjacent to one another to form a substantially complete ring ("ring" hereinafter) of the front acoustic panel 56a. Each acoustic panel member 60a interfaces with the fan casing 52a as shown in FIG. 7 in one embodiment. As further shown in FIG. 7, each acoustic panel member 60a includes a forward rail 64a, an aft rail 68a, and honeycomb acoustic material 72a disposed therebetween. As further shown in FIG. 7, the aft rail 68a includes an aft protrusion 92a that protrudes in the aft direction and is disposed above a forward protrusion 96a of the fan casing 52a.

As further shown in FIG. 5, each acoustic panel member 60a is removably secured to an adjacent acoustic panel member 60a by a releasable fastening assembly 108, for a total of four releasable fastening assemblies 108 securing the four acoustic panel members 60a to one another. Securing the acoustic panel members 60a in this manner provides improved radial securement of the front acoustic panel 56a. In other words, no one acoustic panel member 60a can fall toward the center because each is secured to another acoustic panel member 60a to form a substantially complete ring of the front acoustic panel 56a. Moreover, the front acoustic panel 56a does not need to interface with sixteen brackets 76 for radial securement as in the prior art shown in FIG. 2. The elimination of the sixteen brackets 76 and their associated horizontal fasteners 78 provides cost savings during manufacture and provides ease of installation and repair/replacement.

The front acoustic panel 56a having the releasable fastening assemblies 108 also has advantages over an actual full hoop front acoustic panel because a full hoop front acoustic panel can be difficult to manufacture, install, repair and replace. For example, if one part of a full hoop front acoustic panel is damaged during flight, the entire full hoop front acoustic panel may have to be removed from the aircraft engine to repair the one part that is damaged. Such a task may necessitate more than an overnight maintenance session, which risks a delay or cancellation of the flight that was scheduled for the following day. The front acoustic panel 56a having the releasable fastening assemblies 108 reduces the likelihood of such inconveniences because one acoustic panel member 60a can be removed, repaired, and replaced without uninstalling other non-damaged acoustic panel members 60a due to the releasable or unlockable nature of the releasable fastening assemblies 108, which is further described below.

Figure 6:
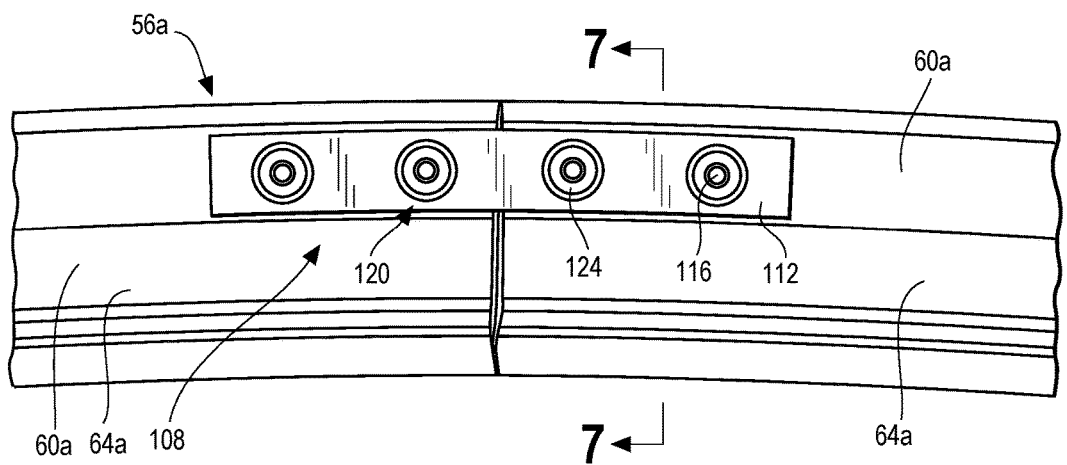
FIG. 6 is an enlarged front elevational view of the portion of FIG. 5 indicated by line 6 of FIG. 5.

The releasable fastening assembly 108 can be any type of assembly that can secure one acoustic panel member 60a to a neighboring acoustic panel member 60a in a releasable or unlockable manner. In a first embodiment, the releasable fastening assembly 108 comprises a strap 112 and a plurality of forward-protruding threaded fasteners 116, as shown in FIG. 6. The strap 112 includes four apertures 120 for receiving or accommodating the four threaded fasteners 116. In this embodiment, each acoustic panel member 60a includes two threaded fasteners 116 protruding in a forward direction out of the forward rail 64a, as shown in FIG. 6, where the forward direction is coming out of the page. Two acoustic panel members 60a are positioned adjacent to one another such that four threaded fasteners 116 are protruding in a forward direction. As another step, the strap 112 is positioned onto the acoustic panel members 60a such that the threaded fasteners 116 protrude through the apertures 120 of the strap 112, as shown in FIGS. 6 and 7. Optionally, washers may be positioned about the threaded fasteners 116 and forward of the strap 112. As another step, four nuts 124 are fastened onto the four threaded fasteners 116 to secure the strap 112 to the threaded fasteners 116, thereby securing one acoustic panel member 60a to another acoustic panel member 60a. As further shown in FIG. 7, a head side of one of the threaded fasteners 116 is bonded to an inner wall of the front rail 64a. As further shown in FIG. 7, the head side of the threaded fastener 116 has a radial extent sufficient to provide surface area for bonding of the threaded fastener 116 to the front rail 64a to provide anti-rotation. Moreover, the axial extent of the head side of the threaded fastener 116 is limited by the need to provide adequate acoustic area. Optionally, there may be two threaded fasteners 116 instead of four and the strap 112 may be shorter because it needs to facilitate only two threaded fasteners, not four.

The first acoustic panel member 60a and the second acoustic panel member 60a each comprise a front structural member in the form of a forward rail 64 and an aft structural member in the form of an aft rail 68a, as shown in FIG. 7. The strap 112 is disposed adjacent the forward rail 64a of each acoustic panel member 60a, as shown in FIG. 7. In this way, the releasable fastening assembly 108 secures a forward rail 64a of one acoustic panel member 60a to a forward rail 64a of an adjacent acoustic panel member 60a, as shown in FIG. 6. Releasable fastening assemblies 108 disposed forward of the forward rail 64a are conveniently accessible from a forward side of the front acoustic panel 56a for when an assembly 108 needs to be released or unlocked or reinstalled. In this manner, four releasable fastening assemblies secure the four acoustic panel members 60a to one another to form a ring of the front acoustic panel 56a, as shown in FIG. 5. The releasable fastening assembly 108 shown in FIGS. 5-8 can be released by removing the nuts 124, optionally removing any washers, and removing the strap 112 from the threaded fasteners 116. This results in unsecurement of adjacent acoustic panel members 60a from one another. Steps described with respect to the releasable fastening assembly 108 of FIGS. 5-7 and with respect to other releasable fastening assemblies 108 (which are described in related co-pending U.S. patent application Ser. No. 15/452,311 entitled "Acoustic Panel of Turbine Engine and Method of Arranging the Acoustic Panel" by Robert Heeter et al. filed Mar. 7, 2017, owned by the assignee of the present application) can be used during installation, during replacement of an acoustic panel member 60a with a new acoustic panel member 60a or during repair of the acoustic panel member 60a (when the repaired acoustic panel member 60 needs to be removed from or re-installed in the aircraft engine 20a).

Figure 8:
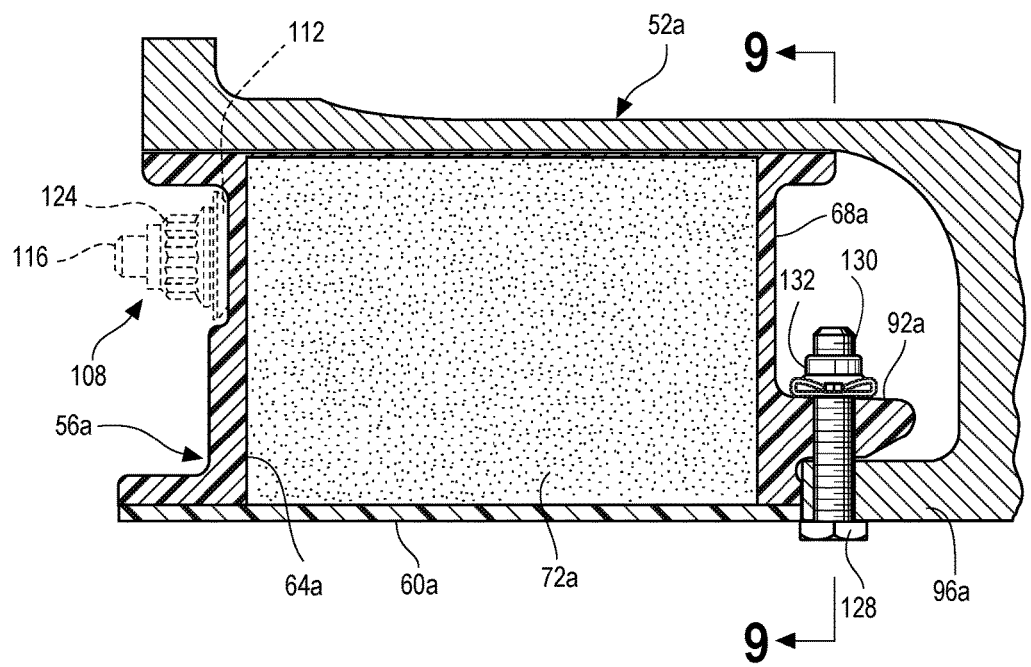
FIG. 8 is an enlarged cross-sectional view of the portion of FIG. 4 indicated by line 8 of FIG. 4, showing one member of the acoustic panel circumferentially secured to the fan casing by a first embodiment of the securement mechanism.
Figure 9:
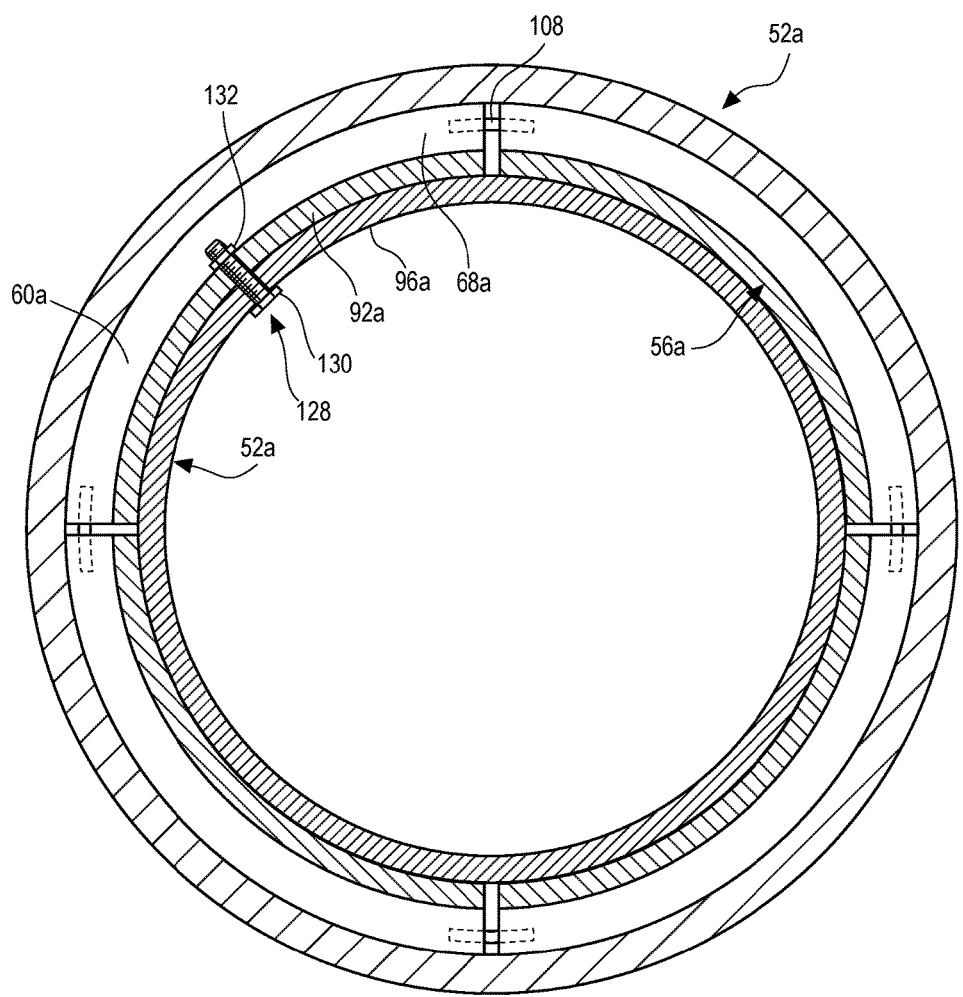
FIG. 9 is a schematic rear cross-sectional view of the acoustic panel and the fan casing, wherein the cross-section is taken along lines 9-9 of FIG. 8, showing one member of the acoustic panel circumferentially secured to the fan casing by the first embodiment of a securement mechanism and showing each member of the acoustic panel secured to other members of the acoustic panel by a releasable fastening assembly.

Referring now to FIG. 9, the acoustic panel 56a is secured to the fan casing 52a by at least one securement mechanism 128 such that the acoustic panel 56a is substantially circumferentially fixed relative to the fan casing 52a. The securement mechanism 128 is accessible from a radially inward side of the fan casing 52a. The securement mechanism 128 shown in FIGS. 8 and 9 is a first embodiment of the securement mechanism 128. One advantage of the front acoustic panel 56a having a releasable fastening assembly 108 is that circumferential securement to the fan casing 52a can be provided by a single securement mechanism 128, as shown in FIG. 9.

As further shown in FIG. 8, the securement mechanism 128 comprises a threaded fastener 130 disposed radially and a nutplate 132 that is secured to a position atop the aft protrusion 92a of the aft rail 68a of the acoustic panel member 60a. As further shown in FIG. 8, the aft fastener 130 in the form of a threaded fastener is positioned from below the protrusion 96a of the fan casing 52a into an aperture in the protrusion 96a. Moreover, the threaded fastener 130 extends into an aperture in the aft protrusion 92a of the aft rail 68a. The threaded fastener 130 is secured or mated to the nutplate 132, thereby securing the aft rail 68a of the acoustic panel member 60a to the protrusion 96a of the fan casing 52a. In this way, the securement mechanism 128 provides circumferential securement of one acoustic panel member 60a with respect to the fan casing 52a. And since the one acoustic panel member 60a (shown in FIG. 8) is secured to the other three acoustic panel members 60a to form a ring of the front acoustic panel 56a (as shown in FIG. 5), the securement mechanism 128 also provides circumferential securement of the entire front acoustic panel 56a to the fan casing 52a, as shown in FIG. 9. It should be noted that the four releasable fastening assemblies 108 can partially be seen in FIG. 9.

In addition, the securement mechanism 128 provides axial securement of the entire front acoustic panel 56a because the acoustic panel member 60a secured to the threaded fastener 130 cannot move very substantially in the direction of the longitudinal axis 48 of the aircraft engine 20a (the axis 48 can be seen in FIG. 4). It should also be noted that the first embodiment 128 of the securement mechanism shown in FIG. 8 is releasable. In case the front acoustic panel 56a needs to be removed, the threaded fastener 132 can be accessed from the radially inward side and unfastened from the nutplate 132 to release the securement mechanism 128, thereby freeing the front acoustic panel 56a from axial and circumferential securement relative to the fan casing 52a. The substantially complete ring of the front acoustic panel 56a can then be removed from the aircraft engine 20a for replacement or repair. Alternatively, one or more releasable fastening assemblies 108 can be released, and one or more of the acoustic panel members 60a can be removed for repair without removing remaining non-damaged acoustic panel members 60a.

One advantage of using the securement mechanism 128 shown in FIG. 8 instead of the O-ring 104 of the prior art shown in FIG. 2 is that the securement mechanism 128 provides circumferential securement. This securement helps in avoiding damaging frettage that can occur when the front acoustic panel rubs the fan casing due to loose circumferential securement. In addition, the improved circumferential securement helps prevent the phenomenon of sealant falling down between the front acoustic panel and the fan casing.

Figure 10:
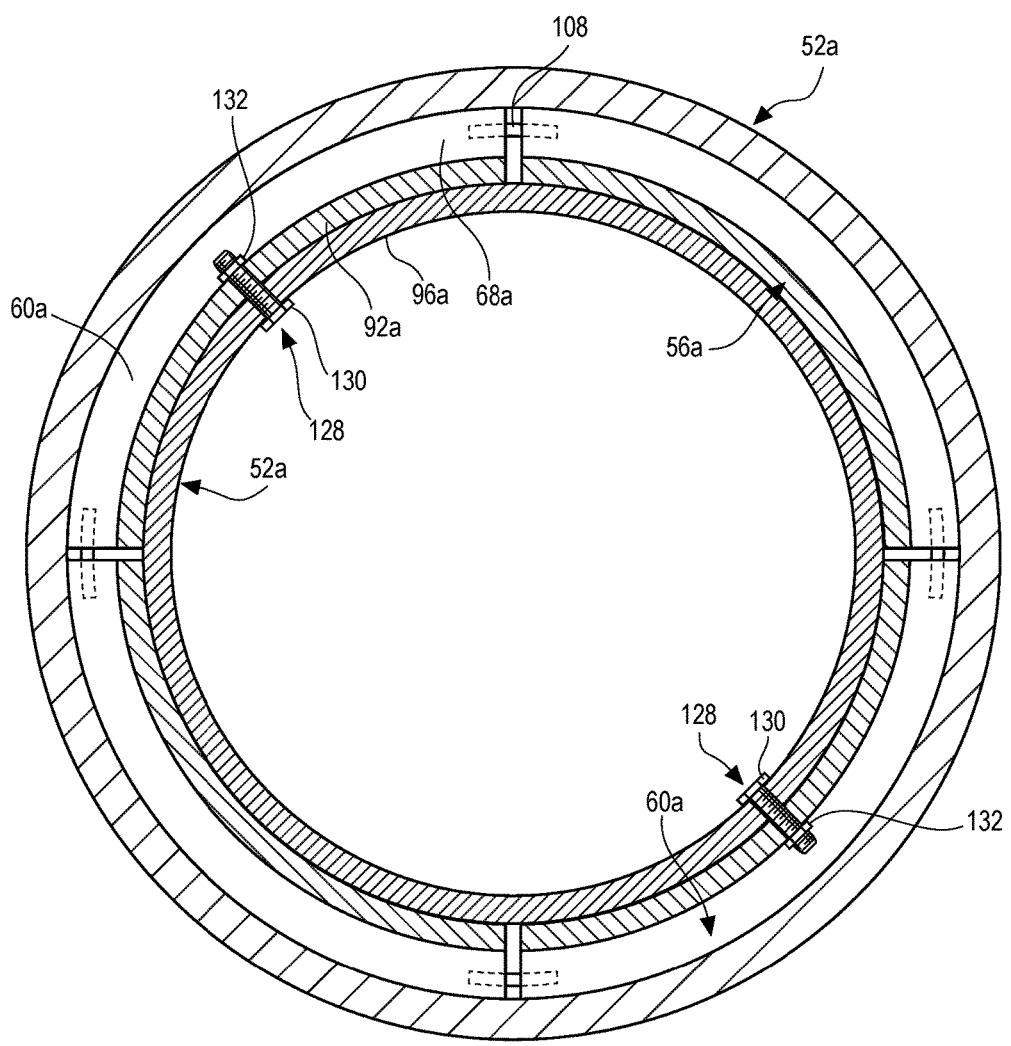
FIG. 10 is a schematic rear cross-sectional view of an acoustic panel and a fan casing, with the section taken at a plane similar to the section indicated by lines 9-9 of FIG. 8, showing two members of the acoustic panel each secured to the fan casing by a securement mechanism.

In some embodiments of the aircraft engine 20a, more than one securement mechanism 128 is used to secure the front acoustic panel 56a to the fan casing 52a, as shown in FIG. 10. Such additional securement ensures that the circumferential and axial securement is fail-safe in case a securement mechanism 128 fails. In FIG. 10, two acoustic panel members 60a are each secured by a securement mechanism 128 to a part of the fan casing 52a. In this embodiment, a total of two circumferentially spaced securement mechanisms 128 secure the front acoustic panel 56a to the fan casing 52a such that the acoustic panel 56a is substantially circumferentially fixed relative to the fan casing 52a and is substantially axially fixed relative to the fan casing 52a. In this embodiment, the fan casing 52a includes two apertures to facilitate the two securement mechanisms 128, as shown in FIG. 10. Additionally, the front acoustic panel 56a includes two apertures to facilitate the two securement mechanisms 128, as further shown. In other respects, the embodiment of FIG. 10 may be substantially identical to the embodiment of FIG. 9 and may have similar advantages.

Figure 11:
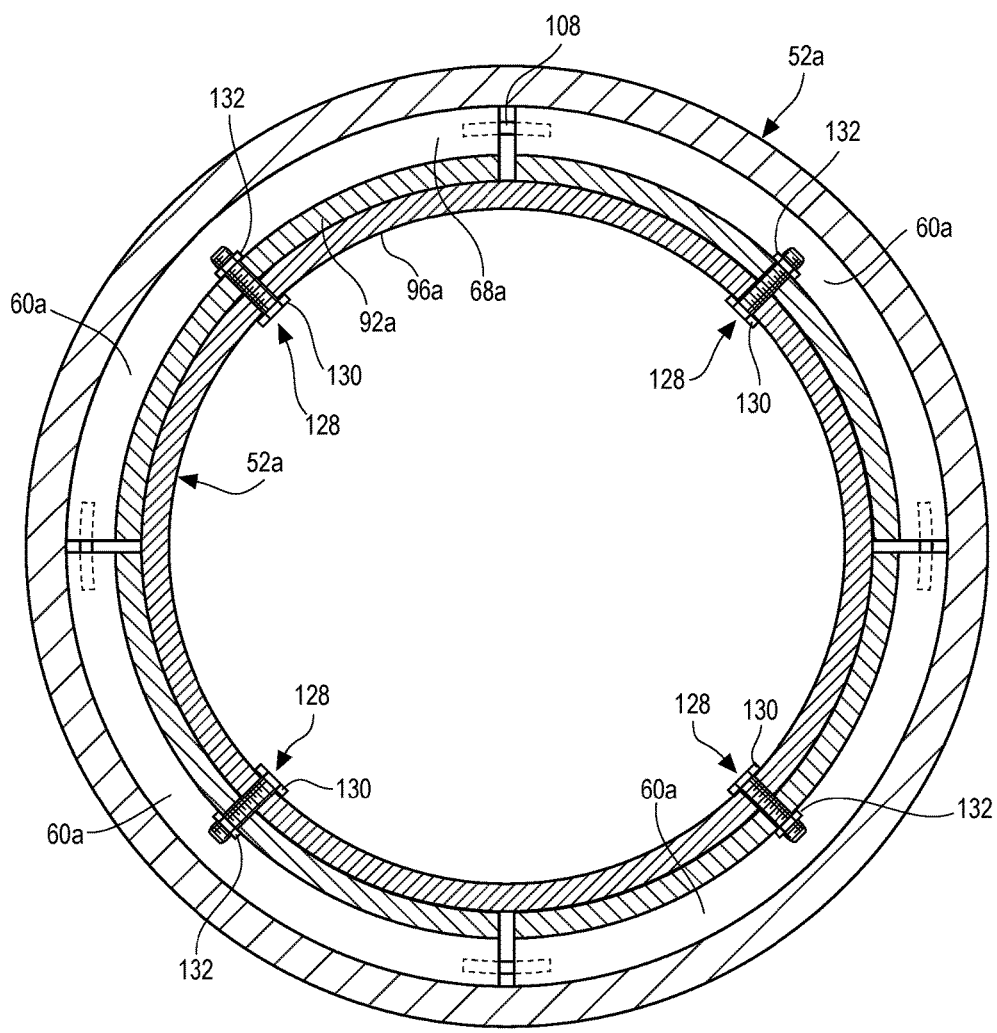
FIG. 11 is a schematic rear cross-sectional view of an acoustic panel and a fan casing, with the section taken at a plane similar to the section indicated by lines 9-9 of FIG. 8, showing each member of the acoustic panel secured to the fan casing by a securement mechanism.

In other embodiments of the aircraft engine 20a, each acoustic panel member 60a may be independently secured to the fan casing 52a by a corresponding securement mechanism 128, as shown in FIG. 11. Such additional securement ensures that the circumferential and axial securement is fail-safe in case a securement mechanism 128 fails. In FIG. 11, a total of four circumferentially spaced securement mechanisms 128 secure the front acoustic panel 56a to the fan casing 52a such that the acoustic panel 56a is substantially circumferentially fixed relative to the fan casing 52a and is substantially axially fixed relative to the fan casing 52a. In this embodiment, the fan casing 52a includes four apertures to facilitate the four securement mechanisms 128. In addition, the front acoustic panel 56a includes four apertures to facilitate the four securement mechanisms 128, as further shown. In other respects, the embodiment of FIG. 11 may be substantially identical to the embodiment of FIG. 9 and may have similar advantages. It should be noted that in certain situations, the releasable fastening assemblies 108 shown in FIG. 11 are not a part of this embodiment because radial securement of the acoustic panel members 60a is provided by the securement mechanism 128 associated with each acoustic panel member 60a.

Figure 12:
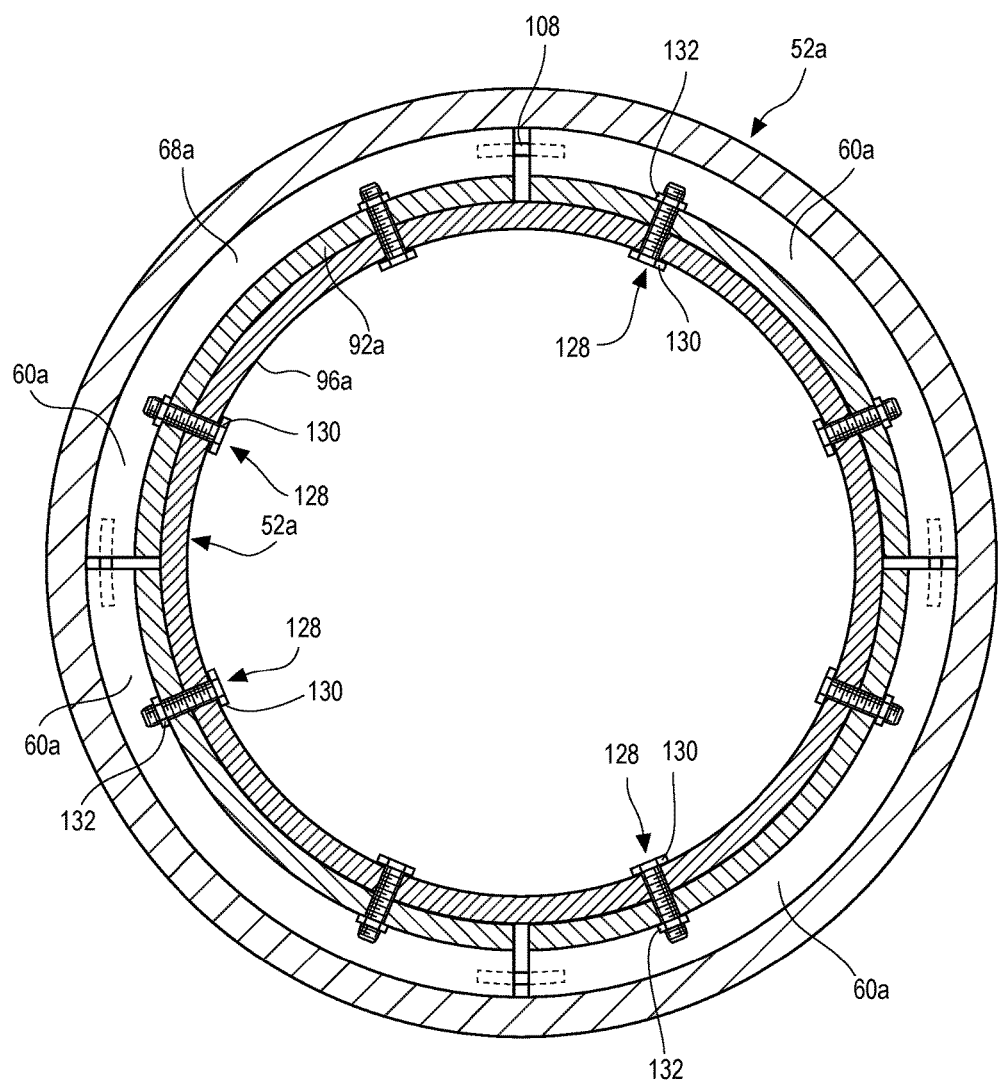
FIG. 12 is a schematic rear cross-sectional view of an acoustic panel and a fan casing, with the section taken at a plane similar to the section indicated by lines 9-9 of FIG. 8, showing each member of the acoustic panel secured to the fan casing by two securement mechanisms.

In still other embodiments of the aircraft engine 20a, multiple securement mechanisms 128 are used to secure each acoustic panel member 60a to the fan casing 52a, as shown in FIG. 12. Such additional securement ensures that the circumferential and axial securement is fail-safe in case a securement mechanism 128 fails. As further shown, each acoustic panel member 60a is secured to the fan casing 52a by two securement mechanisms 128, for a total of eight circumferentially spaced securement mechanisms 128 securing the front acoustic panel 56a to the fan casing 52a (such that the acoustic panel 56a is substantially circumferentially fixed relative to the fan casing 52a and is substantially axially fixed relative to the fan casing 52a). In the embodiment of FIG. 12, the fan casing 52a includes eight apertures to facilitate the eight securement mechanisms 128, as shown in FIG. 12. In addition, the front acoustic panel 56a includes eight apertures to facilitate the eight securement mechanisms 128. In other respects, the embodiment of FIG. 12 may be substantially identical to the embodiment of FIG. 9 and may have similar advantages. It should be noted that in certain situations, the releasable fastening assemblies 108 shown in FIG. 12 are not a part of the embodiment because radial securement of the acoustic panel members 60a is provided by the securement mechanisms 128 associated with each acoustic panel member 60a.

Figure 13:
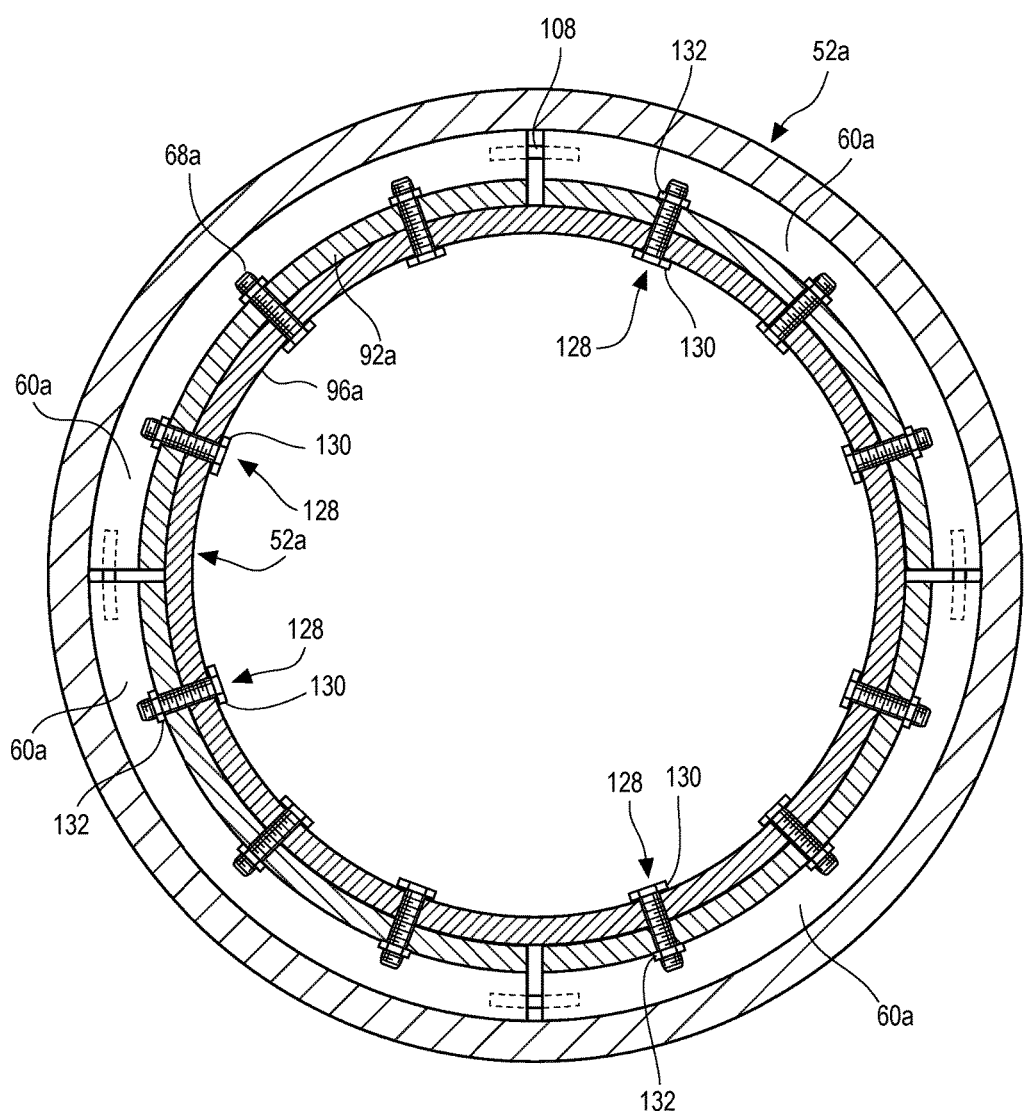
FIG. 13 is a schematic rear cross-sectional view of an acoustic panel and a fan casing, with the section taken at a plane similar to the section indicated by lines 9-9 of FIG. 8, showing each member of the acoustic panel secured to the fan casing by three securement mechanisms.

In still other embodiments of the aircraft engine 20a, three securement mechanisms 128 may be used to secure each acoustic panel member 60a to the fan casing 52a, as shown in FIG. 13. Such additional securement ensures that the circumferential and axial securement is fail-safe in case a securement mechanism 128 fails. In FIG. 13, a total of twelve circumferentially spaced securement mechanisms 128 secure the acoustic panel 56a to the fan casing 52a such that the acoustic panel is substantially circumferentially fixed relative to the fan casing 52a and is substantially axially fixed relative to the fan casing 52a. In this embodiment, the fan casing 52a includes twelve apertures to facilitate the twelve securement mechanisms 128, as shown in FIG. 13. In addition, the front acoustic panel 56a includes twelve apertures to facilitate the twelve securement mechanisms 128. In other respects, the embodiment of FIG. 13 may be substantially identical to the embodiment of FIG. 9 and may have similar advantages. It should be noted that in certain situations, the releasable fastening assemblies 108 shown in FIG. 13 are not a part of the embodiment because radial securement of the acoustic panel members 60a is provided by the securement mechanisms 128 associated with each acoustic panel member 60a.

Figure 14:
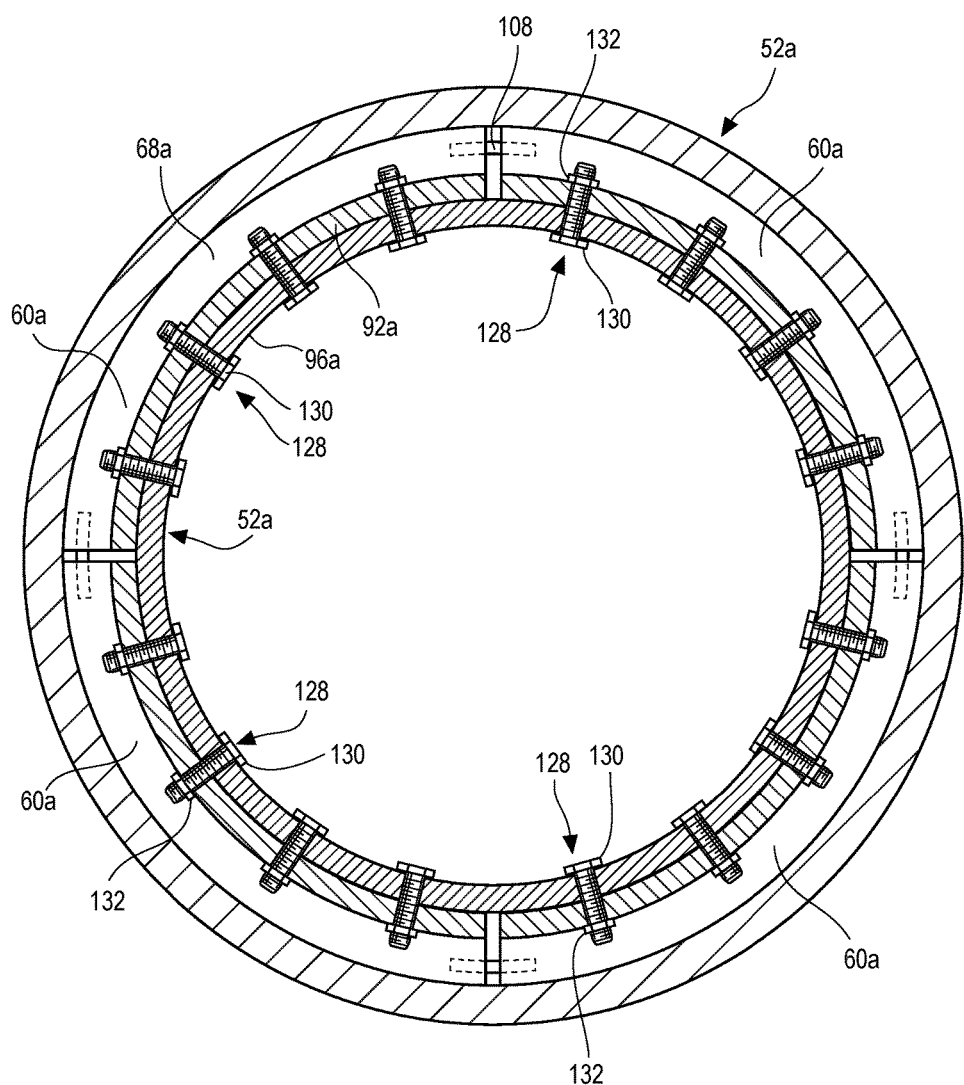
FIG. 14 is a schematic rear cross-sectional view of an acoustic panel and a fan casing, with the section taken at a plane similar to the section indicated by lines 9-9 of FIG. 8, showing each member of the acoustic panel secured to the fan casing by four securement mechanisms.

In still other embodiments of the aircraft engine 20a, four securement mechanisms 128 may be used to secure each acoustic panel member 60a to the fan casing 52a, as shown in FIG. 14. Such additional securement ensures that the circumferential and axial securement is fail-safe in case a securement mechanism 128 fails. In FIG. 14, a total of sixteen circumferentially spaced securement mechanisms 128 secure the front acoustic panel 56a to the fan casing 52a such that the acoustic panel 56a is substantially circumferentially fixed relative to the fan casing 52a and is substantially axially fixed relative to the fan casing 52a. In this embodiment, the fan casing 52a includes sixteen apertures to facilitate the sixteen securement mechanisms 128, as shown in FIG. 14. In addition, the front acoustic panel 56a includes sixteen apertures to facilitate the sixteen securement mechanisms 128. In other respects, the embodiment of FIG. 14 may be substantially identical to the embodiment of FIG. 9 and may have similar advantages. It should be noted that in certain situations, the releasable fastening assemblies 108 shown in FIG. 14 are not a part of this embodiment because radial securement of the acoustic panel members 60*a* is provided by the securement mechanisms 128 associated with each acoustic panel member 60*a*.

Any securement mechanism 128 disclosed herein can be used in the quantities shown in FIGS. 9-14 (the quantities being 1, 2, 4, 8, 12, and 16 respectively) or any other suitable quantity to secure a front acoustic panel to a fan casing of an aircraft engine. This patent application incorporates by reference co-pending U.S. patent application Ser. No. 15/452,311, entitled "Acoustic Panel of Turbine Engine and Method of Arranging the Acoustic Panel" by Robert Heeter et al., filed Mar. 7, 2017, owned by the assignee of the present application. Any securement mechanism 128 or any plurality of securement mechanisms 128 disclosed herein can be used in combination with any releasable fastening assembly 108 disclosed herein or in said related co-pending U.S. patent application Ser. No. 15/452,311, entitled "Acoustic Panel of Turbine Engine and Method of Arranging the Acoustic Panel" by Robert Heeter et al., filed Mar. 7, 2017, owned by the assignee of the present application.

Figure 15:
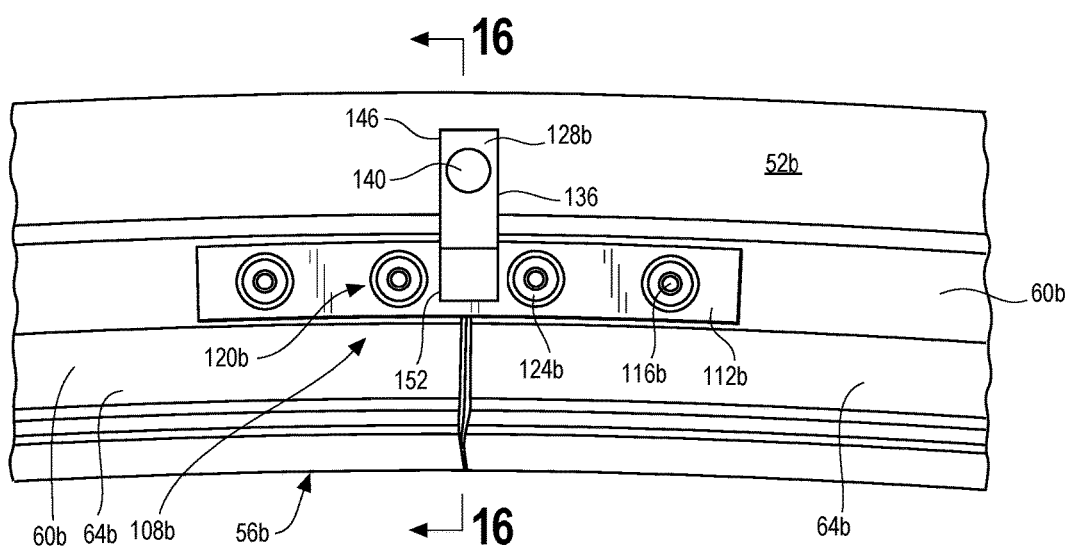
FIG. 15 is an alternative embodiment of the releasable fastening assembly of FIG. 6, showing a second embodiment of a circumferential securement mechanism that is a part of a releasable fastening assembly and is mated to a fan casing.
Figure 16:
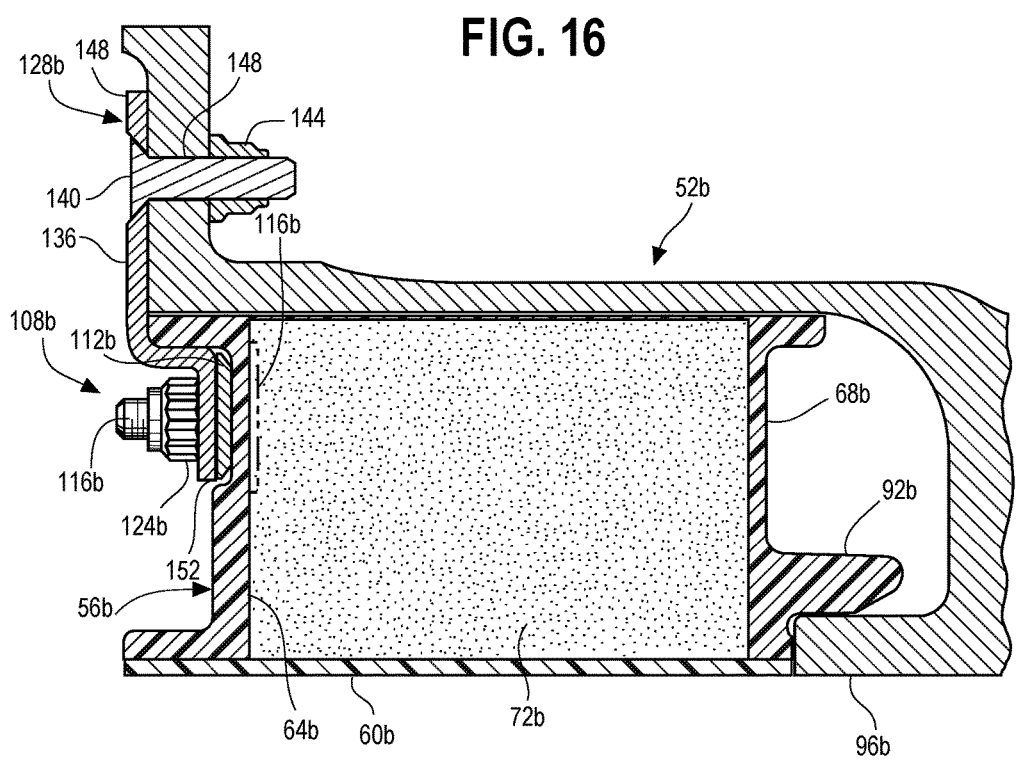
FIG. 16 is a cross-sectional view of an acoustic panel and the fan casing taken along lines 16-16 of FIG. 15, showing the second embodiment of the securement mechanism.

FIGS. 15 and 16 show a second embodiment 128*b* of the securement mechanism. The components of FIGS. 15 and 16 are substantially identical to the components of the embodiment of FIG. 7, except as otherwise described below. For example, a fan casing 52*b* of FIG. 15 is substantially identical to the fan casing 52*a* of FIG. 7, 56*b* is substantially identical to 56*a*, 60*b* to 60*a*, 64*b* to 64*a*, 108*b* to 108, 112*b* to 112, 116*b* to 116, 120*b* to 120, and 124*b* of FIG. 15 is substantially identical to 124 of FIG. 7, except as otherwise described below.

As shown in FIG. 15, the acoustic panel 56*b* is disposed radially inside the fan casing 52*b* of an aircraft engine that is substantially identical to the aircraft engine 20*a* of FIG. 4, except otherwise noted. Two acoustic panel members 60*a* of the acoustic panel 56*b* are disposed adjacent to one another and are secured to one another by a releasable fastening assembly 108*b*. The releasable fastening assembly 108*b* is integral with or attached to a securement mechanism 128*b*. The securement mechanism 128*b* includes an S-shaped bracket 136, a threaded fastener 140, and a nut 144 that can be fastened to the threaded fastener 140, as shown in FIG. 16. A top section 146 of the S-shaped bracket 136 is attached to the fan casing 52*b* by the threaded fastener 140. The threaded fastener 140 is inserted from a forward side of the S-shaped bracket 136 into an aperture in the S-shaped bracket and into a horizontal recess 148 of the fan casing 52*b*. The nut 144 is fastened to the threaded fastener 140 on an aft surface of the fan casing 52*b*. A bottom section 152 of the S-shaped bracket 136 is fastened to or integral with the releasable fastening assembly 108*b*. For example, the bottom section 152 is integral with the strap 112*b* of the releasable fastening assembly 108*b*, as shown in FIG. 16. In this manner, the releasable fastening assembly 108*b* is secured with respect to the fan casing 52*b* by the securement mechanism 128*b*. And since the releasable fastening assembly 108*b* is itself fastened to the front acoustic panel 56*b* (as described above in connection with assembly 108 and acoustic panel 56*a*), the front acoustic panel 56*b* is substantially circumferentially and axially fixed with respect to the fan casing 52*b* by the securement mechanism 128*b*. Thus, the releasable fastening assembly 108*b* having a securement mechanism 128*b* provides circumferential, axial and radial securement of the acoustic panel 56*b* to the fan casing 52*b*.

Optionally, a single securement mechanism 128*b* associated with one of four releasable fastening assemblies 108*b* can secure the acoustic panel 56*b* to the fan casing 52*b* such that the acoustic panel 56*b* is substantially circumferentially and axially fixed relative to the fan casing 52*b*. Alternatively, two, three, four, or more securement mechanisms 128*b* may be used to provide circumferential and axial securement through coupling of one or more releasable fastening assemblies 108*b* to the fan casing 52*b* using one or more threaded fasteners 140*b*. One advantage of an aircraft engine having the securement mechanism 128*b* is that the securement mechanism 128*b* is disposed adjacent the forward rail 64*b* of the front acoustic panel 56*b*—this allows for easy access when the securement mechanism 128*b* needs to be released or unlocked. To release the securement mechanism 128*b*, the nuts 144 are unfastened from the threaded fasteners 140 and the threaded fastener 140 is unfastened from the fan casing 52*b* and the bracket 136. The front acoustic panel 56*b* is then removed from the aircraft engine as a full hoop or one or more acoustic panel members 60*b* are removed individually.

Figure 17:
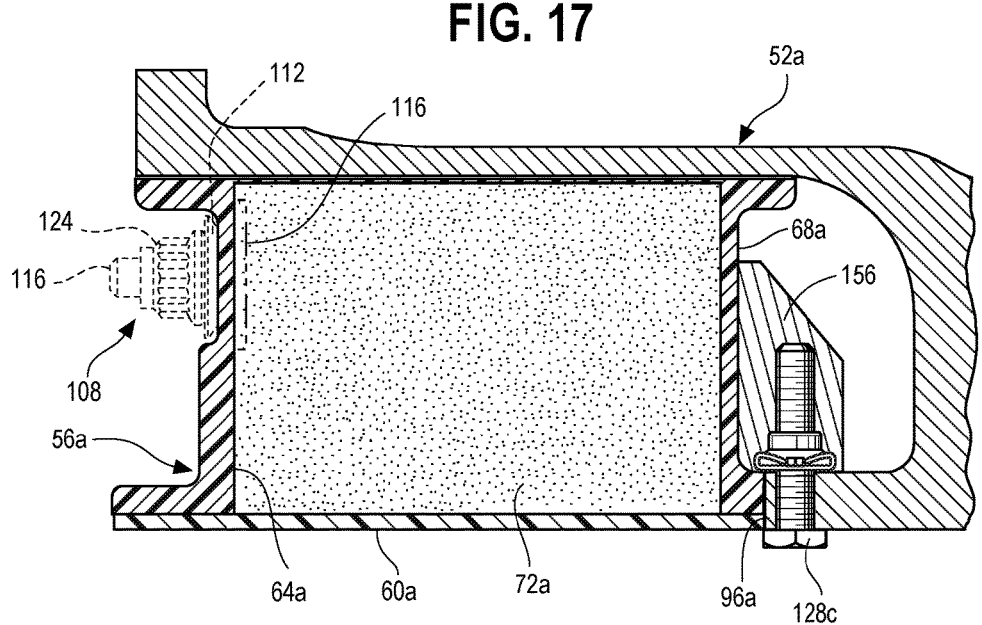
FIG. 17 is an enlarged cross-sectional view of a third embodiment of the securement mechanism used to secure an acoustic panel to a fan casing.

An aircraft engine otherwise (substantially) identical to the aircraft engine 20*a* of FIG. 4 comprises a third embodiment 128*c* of a securement mechanism, shown in FIG. 17. The securement mechanism 128*c* is for providing circumferential and axial securement of the front acoustic panel 56*a*. As shown in FIG. 17, the securement mechanism 128*c* includes a 90-degree nutplate 156 attached to the aft rail 68*a* and further includes a threaded fastener 160. In some instances, the aft rail 68*a* may not include an aft protrusion, as shown in FIG. 17. The nutplate 156 is attached to the aft rail 68*a* by an adhesive or by horizontal fasteners disposed transverse to the aft rail 68*a*. The nutplate 156 is disposed proximal or atop the forward protrusion 96*a* and can receive a radially disposed fastener. The threaded fastener 160 is inserted from the radially inward side of the forward protrusion 96*a* of the fan casing 52*a*. The threaded fastener 160 is inserted through an aperture in the forward protrusion 96*a* and mated to the nutplate 156. In this way, the threaded fastener 160 is fastened to the nutplate 156 such that the front acoustic panel 56*a* is secured to the fan casing 52*a* such that the acoustic panel 56*a* is substantially circumferentially and axially fixed relative to the fan casing 52*a*.

Optionally, one securement mechanism 128*c* provides circumferential and axial securement of the front acoustic panel 56*a*. Alternatively, two, three, four, or more securement mechanisms 128*c* may be used at spaced locations about the ring of the front acoustic panel 56*a* to provide circumferential and axial securement of the front acoustic panel 56*a*. To release the securement mechanism 128*c*, the threaded fastener 160 is unfastened from the nutplate 156, thereby freeing the front acoustic panel 56*a* from the fan casing 52*a*. The front acoustic panel 56*b* is then removed from the aircraft engine as a full hoop or one or more acoustic panel members 60*b* are removed individually.

Figure 18:
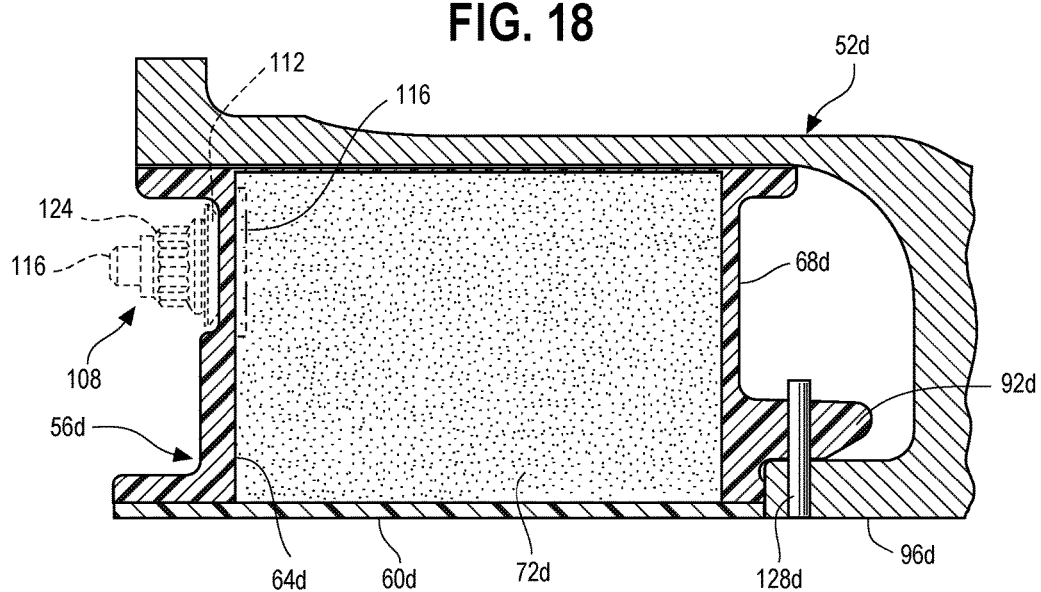
FIG. 18 is an enlarged cross-sectional view of a fourth embodiment of the securement mechanism used to secure an acoustic panel to a fan casing.

An aircraft engine otherwise substantially identical to the aircraft engine 20*a* of FIG. 4 includes a fourth embodiment 128*d* of the securement mechanism, shown in FIG. 18. The components of FIG. 18 are substantially identical to the components of the embodiment of FIG. 7, except as otherwise described below. For example, a fan casing 52*d* of FIG. 18 is substantially identical to the fan casing 52*a* of FIG. 7, 56*d* is substantially identical to 56*a*, 60*d* to 60*a*, 64*d* to 64*a*, 92*d* to 92*a*, and 96*d* of FIG. 18 is substantially identical to 96*a* of FIG. 7, except as otherwise noted. As shown in FIG. 18, the acoustic panel 56*d* is disposed radially inside the fan casing 52*d*. The acoustic panel 56*d* is secured to the fan casing 52*d* by the securement mechanism 128*d* such that the acoustic panel 56*d* is substantially circumferentially fixed relative to the fan casing 52*d* and substantially axially fixed relative to the fan casing 52*d*. Again, the acoustic panel 56*d* and the fan casing 52*d* may be a part of an aircraft engine that is similar to the aircraft engine 20*a* of FIG. 4.

The securement mechanism 128d of FIG. 18 is a radial pin that is fastened to the acoustic panel 56d and to the fan casing 52d by an interference fit. The interference fit is accomplished by apertures that are slightly smaller than the radial pin 128d. The forward protrusion 96d of the fan casing 52d includes an aperture that is slightly smaller than the radial pin 128d. Moreover, the aft protrusion 92d of the aft rail 68d of the front acoustic panel 56d includes an aperture that is slightly smaller than the radial pin 128d. The radial pin 128d is inserted into the forward protrusion 96d from the radially inward side and inserted or hammered into the forward protrusion 96d and the aft protrusion 92d, as shown in FIG. 18. This results in circumferential and axial securement of the front acoustic panel 56d relative to the fan casing 52d. Optionally, one securement mechanism 128d in the form of a radial pin provides circumferential and axial securement of the front acoustic panel 56d. Alternatively, two, three, four, or more securement mechanisms 128d provide circumferential and axial securement of the front acoustic panel 56d.

Figure 19:
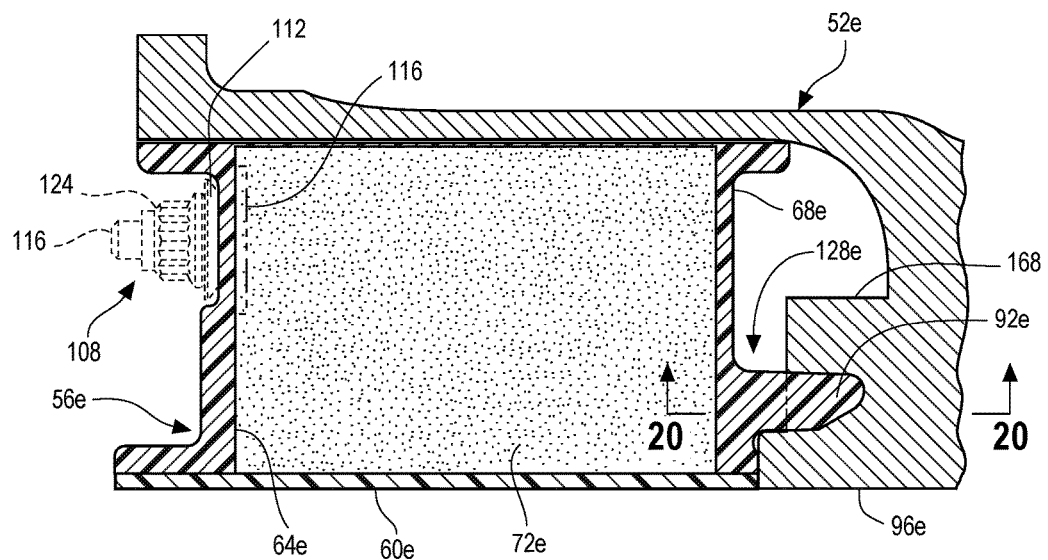
FIG. 19 is an enlarged cross-sectional view of a fifth embodiment of the securement mechanism used to secure an acoustic panel to a fan casing.
Figure 20:
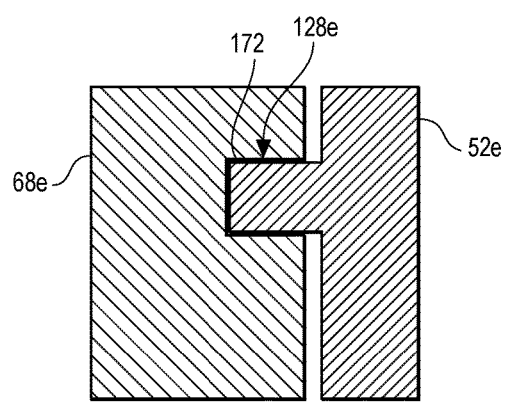
FIG. 20 is a schematic bottom cross-sectional view of the fifth embodiment of the securement mechanism taken along lines 20-20 of FIG. 19.

An aircraft engine otherwise substantially identical to the aircraft engine 20a of FIG. 4 includes a fifth embodiment 128e of the securement mechanism, shown in FIGS. 19 and 20. The components of FIGS. 19 and 20 are substantially identical to the components of the embodiment of FIG. 7, except as otherwise described below. For example, a fan casing 52e of FIG. 19 is substantially identical to the fan casing 52a of FIG. 7, 56e is substantially identical to 56a, 60e to 60a, 64e to 64a, 92e to 92a, and 96e of FIG. 19 is substantially identical to 96a of FIG. 7, except as otherwise noted. As shown in FIG. 19, the acoustic panel 56e is disposed radially inside the fan casing 52e. The acoustic panel 56e is secured to the fan casing 52e by the securement mechanism 128e such that the acoustic panel 56e is substantially circumferentially fixed relative to the fan casing 52e and substantially axially fixed relative to the fan casing 52e. Again, the acoustic panel 56e and the fan casing 52e may be a part of an aircraft engine that is similar to the aircraft engine 20a of FIG. 4.

As shown in FIG. 19, the fan casing 52e includes a key protrusion 168 extending forwardly into a recess 172 in the aft protrusion 92e of the aft rail 68e. The key protrusion 168 and the recess 172 interlock with one another as shown in FIG. 20 and together form the securement mechanism 128e. In other words, the key protrusion 168 circumferentially interferes with the recess 172. During installation, the front acoustic panel 56e having the recess 172 is moved axially in the aft direction such that the recess 172 surrounds the key protrusion 168. During removal, the front acoustic panel 56e having the recess 172 is moved axially in the forward direction. Optionally, one securement mechanism 128e provides circumferential and axial securement of the front acoustic panel 56e. Alternatively, two, three, four, or more securement mechanisms 128e provide circumferential and axial securement of the front acoustic panel 56e. The front acoustic panel 56e is then removed from the aircraft engine as a full hoop or one or more acoustic panel members 60e are removed individually.

FIGS. 21-25 show an aircraft engine having a composite fan casing and a securement ring mated to the composite fan casing, wherein the securement ring secures acoustic panel members to one another and circumferentially and axially secures a front acoustic panel to the composite fan casing. Referring now to FIG. 21, an exemplary aircraft engine in the form of a gas turbine engine 20f includes an intake 24, a fan 28, a compressor 32, a combustion chamber 36 that receives compressed air from the compressor 32, a turbine 40 that converts rapidly expanding fuel and air into rotary motive power, and an exhaust 44. The fan 28 includes a plurality of fan blades 46 and rotates about a central longitudinal axis 48 of the turbine engine 20f. The fan 28 may be disposed proximal a forward end of the engine 20f, as further shown in FIG. 21. As further shown, the turbine engine 20f includes a composite fan casing 52f that circumferentially surrounds the fan 28. The fan 28 is an example of a rotating structure and the fan casing 52f is an example of a stationary structure of the aircraft engine 20f.

As further shown in FIG. 21, the turbine engine 20f further comprises a front acoustic panel 56f that is disposed adjacent the fan casing 52f and forward of the fan blades 46. As further shown in FIG. 25, the front acoustic panel 56f includes four acoustic panel members 60f that together form a substantially complete ring (or annulus) that is enclosed by the fan casing 52f. The front acoustic panel 56f is for noise reduction and circumferentially surrounds a rotating structure such as a fan 28, as shown in FIG. 21. More particularly, the front acoustic panel 56f is disposed radially inside the fan casing 52f, as shown in FIG. 21.

In one embodiment, each acoustic panel member 60f interfaces with the fan casing 52f as shown in FIG. 22. As further shown in FIG. 22, each acoustic panel member 60f includes a forward rail 64f and honeycomb acoustic material 72f disposed aft of the forward rail 64f. As shown in FIG. 22, a securement ring 176 is disposed between the fan casing 52f and a nacelle 180. The securement ring 176 is a complete ring circumferentially surrounding the fan 28 (as shown in FIG. 21) and is disposed between the fan casing 52f and the nacelle 180 (as shown in FIG. 22) for the entire circumference of the fan casing 52f. An interface fastener 184 extends through the securement ring 176, fan casing 52f and the nacelle 180, thereby fastening these three components to one another, as shown in FIG. 22. The interface fastener 184 may be a pin, as shown in FIG. 22, that is fastened by interference fit or it may be a threaded fastener that is fastened by nuts, for example.

As further shown in FIG. 22, a securement mechanism 128f secures a forward rail 64f of an acoustic panel member 60f to the securement ring 176. The securement mechanism 128f includes a nutplate 188 attached to the forward rail 64f and further includes a threaded fastener 192 that extends through an aperture in the securement ring 176 and mates with the nutplate 188, thereby securing the acoustic panel member 60f to the securement ring 176. The aperture in the securement ring 176 is disposed near an inner diameter of the securement ring 176 in the illustrated embodiment of FIG. 22. The threaded fastener 192 is inserted into the securement ring 176 and the nutplate 188 from a forward side, as shown in FIG. 22. Alternatively, the fastening of a securement ring to the forward rail 64f is accomplished via studs projecting forward from the forward rail 64f and extending through an aperture of the securement ring, which may be bent aft in an S-shape. The studs may be secured to the securement ring using nuts. In this way, the forward rail 64f is secured to a securement ring in a manner similar to how the strap 112 is secured to the forward rail 64a of FIG. 7, which is described in more detail above.

Figure 25:
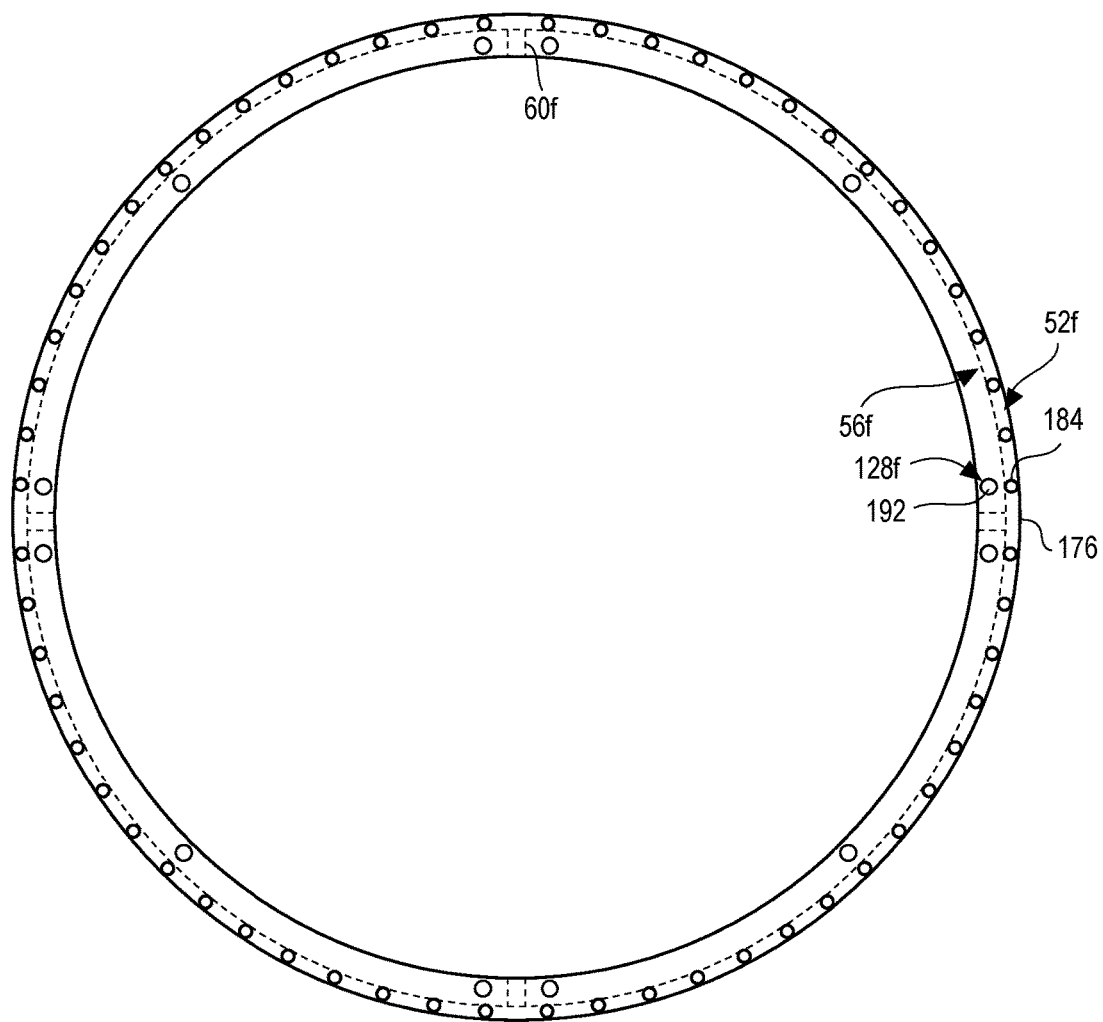
FIG. 25 is a front elevational view of the securement ring of FIG. 22, with a portion of the composite fan casing and the acoustic panel shown in dotted line to indicate they are hidden behind the securement ring.

As further shown in FIG. 25, the securement ring 176 is secured to the front acoustic panel 56f by twelve circumferentially spaced threaded fasteners 192 that mate with corresponding twelve circumferentially spaced nutplates 188 that are attached to the front acoustic panel 56f. In other words, each acoustic panel member 60f is secured to the securement ring 176 by three spaced securement mechanisms 128f. In FIG. 25, parts of each acoustic panel member 60f are shown in outline because the acoustic panel members 60f are disposed behind the securement ring 176 and would not be visible. As further shown in FIG. 25, sixty circumferentially spaced interface fasteners 184 secure the securement ring 176 to the fan casing 52f and the nacelle 180 in the manner shown in detail in FIG. 22, for example.

Securing the acoustic panel members 60f to the securement ring 176 in the manner of FIG. 25 means that the acoustic panel members 60f are radially secured. In other words, the acoustic panel members 60f cannot fall toward the central longitudinal axis 48 of FIG. 21. Additionally, the acoustic panel members 60f of FIG. 25 are circumferentially and axially secured relative to the securement ring 176 by the securement mechanism 128f. And since the securement ring 176 is itself circumferentially and axially secured to the fan casing 52f by the interface fasteners 184, the acoustic panel members 60f are radially, circumferentially, and axially secured to the fan casing 52f using the securement ring 176 and the securement mechanisms 128f. In other words, the acoustic panel 56f is secured to the securement ring 176 such that the acoustic panel 56f is substantially circumferentially fixed relative to the fan casing 52f. It should be noted that other types of securement rings 176 and securement mechanisms 128f may be used to accomplish this end.

In the embodiment shown in FIG. 23, a securement ring 176g has an aft protrusion 196 extending in the aft direction, optionally nearer an inner diameter of the securement ring 176g than the outer diameter of the securement ring 176g. It should be noted that the components shown in FIG. 23 are a part of an aircraft engine substantially identical to the aircraft engine 20f of FIG. 21. The components shown in FIG. 23 are substantially identical to the components of the embodiment of FIG. 22, except as otherwise noted.

As shown in FIG. 23, the aft protrusion 196 is disposed above a bottom lip 200 of the forward rail 64f. The aft protrusion 196 and the bottom lip 200 include apertures that can facilitate a radial fastener. Another embodiment 128g of the securement mechanism secures the aft protrusion 196 to the bottom lip 200 such that an acoustic panel 56g is secured to the securement ring 176g such that the acoustic panel 56f is substantially circumferentially fixed relative to the fan casing 56g. The securement mechanism 128g includes a nutplate 202 disposed atop the aft protrusion 196 and further includes a threaded fastener 204 inserted from the radially inward direction into the bottom lip 200, through the aft protrusion 196, and mated to the nutplate 202. The threaded fastener 204 is disposed in a radial direction of the aircraft engine. In this way, the securement mechanism 128g secures the front rail 64f and the securement ring 176g, as shown in FIG. 23. One or more such securement mechanisms 128g can secure each acoustic panel member 60f to the securement ring 176g such that the acoustic panel members 60f are attached to one another to form a substantially complete ring of the front acoustic panel 56f. In other words, radial securement of the acoustic panel members 60f can be provided by circumferentially spaced securement mechanisms 128g in a manner similar to the embodiment of FIG. 25. Moreover, the securement ring 176g is circumferentially and axially secured to the fan casing 52f and the nacelle 200 by one or more circumferentially spaced interface fasteners 184, thereby ensuring circumferential and axial securement of the front acoustic panel 56f to the fan casing 52f.

Yet another type of securement ring and securement mechanism may be used to accomplish this purpose. In the embodiment shown in FIG. 24, a securement ring 176h has an aft protrusion 208 distal from an inner diameter of the securement ring 176h (distal in comparison to the distance between the aft protrusion 196 and the inner diameter of the ring 176g). It should be noted that the components shown in FIG. 24 are a part of an aircraft engine substantially identical to the aircraft engine 20f of FIG. 21. Furthermore, the components shown in FIG. 24 are substantially identical to the components of the embodiment of FIG. 22, except as otherwise noted.

The aft protrusion 208 is disposed above an upper lip 88h of the forward rail 64h. The aft protrusion 208 and an upper lip 88h include apertures that can facilitate a fastener. A securement mechanism 128h secures the aft protrusion 208 to the upper lip 88h such that the acoustic panel 56h is secured to the securement ring 176h such that the acoustic panel 56h is substantially circumferentially fixed relative to the fan casing 56f. The securement mechanism 128h includes a nutplate 210 disposed below the upper lip 88h and a threaded fastener 214 inserted from the radially outward direction into the upper lip 88h, through the aft protrusion 208, and mated to the nutplate 210. This secures the front rail 64h and the securement ring 176h. One or more such securement mechanisms 128h can secure each acoustic panel member 60h to the securement ring 176h such that the acoustic panel members 60h are attached to one another to form a substantially complete ring of the front acoustic panel 56h. In other words, the acoustic panel members 60h can be radially secured. Additionally, the securement ring 176h is circumferentially and axially secured to the fan casing 52h and nacelle 200 by one or more interface fasteners 184, thereby ensuring circumferential and axial securement of the front acoustic panel 56h to the fan casing 52h.

It should be noted that the securement rings 176, 176f and 176g may be made of metal, for example. Furthermore, if the acoustic panel 56f needs to be taken out of the aircraft engine 20f, the interface fasteners 184 are unfastened and the securement ring 176 along with the acoustic panel 56f can be removed from the aircraft engine 20f.

In addition to the advantages described elsewhere, the front acoustic panel 56a having the releasable fastening assemblies 108 and the securement mechanism(s) 128 meets the zero-splice requirements for good noise mitigation. In other words, the releasable fastening assemblies 108 and the securement mechanism(s) do not intrude into honeycomb acoustic material 72a of the front acoustic panel 56a in a way that violates zero-splice requirements. The relatively continuous circumferential coverage provided by the honeycomb acoustic material 72a is maintained, thereby maintaining good noise reduction. The front acoustic panel 56a having one of the releasable fastening assemblies 108 and the securement mechanism(s) has another advantage in that the manufacturing of the front acoustic panels 56a is simple in comparison with manufacturing a full-hoop front acoustic panel.

One further improvement to the front acoustic panels 56a is to replace polysulphide ribs from an outer diameter of the front acoustic panels 56a with a soft closed-cell foam material instead.

INDUSTRIAL APPLICABILITY

In summary, a four-piece front acoustic panel where the four pieces are secured to one another by four releasable fastening assemblies and secured to the fan casing by a securement mechanism has numerous advantages. Moreover, a four-piece front acoustic panel where the four pieces are secured to one another and to a composite fan casing by a securement ring has numerous advantages. First, such acoustic panels can hold themselves radially. Moreover, improved circumferential and axial securement is achieved, thereby reducing any damage from fretting. A front acoustic panel described herein also eliminates the need for O-rings near the aft rail and brackets fastened to the fan casing near the forward rail. Because there is no need for an O-ring, there is also no need for an O-ring recess in the fan casing (an example recess 100 can be seen in FIG. 2). Thus, machining time for the fan casing is reduced. The machining time for the fan casing is further reduced because there is no need to machine a horizontal recess that receives fasteners that secure brackets to the fan casing. Such brackets 76 are shown in FIG. 2.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:

1. An aircraft engine, comprising:
   a rotating structure;
   a casing circumferentially surrounding the rotating structure; and
   an acoustic panel for noise reduction circumferentially surrounding the rotating structure and disposed proximal the casing, where the casing forms a forward axially extending protrusion towards an aft side of the acoustic panel, the acoustic panel comprising a plurality of acoustic panel members each acoustic panel member comprising a forward rail, an aft rail having an aft protrusion extending from the aft rail above the protrusion of the casing, and acoustic material disposed there between, wherein each acoustic panel member is secured to the casing by at least one securement mechanism accessible from a radially inward side of the casing on an aft side of the acoustic panel, the securement mechanism comprising a removable fastener positioned radially from below the protrusion in the casing into an aperture in the aft protrusion of the acoustic panel member and extending into an aperture in the aft protrusion of the aft rail, the plurality of acoustic panel members disposed adjacent to one another such that the acoustic panel is substantially circumferentially fixed relative to the casing and each acoustic panel member is fully detachable from the casing by removal of the removable fastener.

2. The aircraft engine of claim 1, wherein the at least one securement mechanism is releasable.

3. The aircraft engine of claim 2, wherein the acoustic panel is secured to the casing by the at least one securement mechanism such that the acoustic panel is substantially axially fixed relative to the casing.

4. The aircraft engine of claim 2, wherein the at least one securement mechanism comprises a nutplate secured to the aft rail and a threaded fastener disposed radially, wherein the threaded fastener extends through a portion of the casing and is mated to the nutplate.

5. The aircraft engine of claim 4, wherein the nutplate is secured to a position atop an aft protrusion of the aft rail of the acoustic panel.

6. The aircraft engine of claim 2, wherein the at least one securement mechanism is one of a plurality of securement mechanisms and wherein each acoustic panel member of the plurality of acoustic panel members is independently secured to the casing by a securement mechanism of the plurality of securement mechanism.

7. The aircraft engine of claim 6, wherein the plurality of securement mechanisms are circumferentially spaced from one another.

8. The aircraft engine of claim 1, wherein the at least one securement mechanism comprises a pin that is fastened to the acoustic panel and to the casing by an interference fit.

9. A turbine engine, comprising:
   a fan;
   a fan casing circumferentially surrounding the fan;
   an acoustic panel for noise reduction circumferentially surrounding the fan, the acoustic panel comprising a plurality of acoustic panel members arranged adjacent to one another to form a substantially complete ring of the acoustic panel, wherein a first acoustic panel member of the plurality of acoustic panel members is adjacent to a second acoustic panel member of the plurality of acoustic panel members and wherein the first acoustic panel member is removably secured to the second acoustic panel member by a releasable fastening assembly fastened to a forward side of each acoustic panel member; and
   a securement mechanism comprising a bracket affixed to the casing and affixed to a forward side of the forward rail of each acoustic panel member, where the securement mechanism is accessible from the forward side of the acoustic panel member and is configured to secure the acoustic panel to the fan casing such that the acoustic panel is substantially circumferentially fixed relative to the fan casing.

10. The turbine engine of claim 9, wherein the securement mechanism secures the acoustic panel to the fan casing such that the acoustic panel is substantially axially fixed relative to the fan casing.

11. The aircraft engine of claim 9, wherein the bracket is an S-shaped bracket having a top section attached to the casing by a threaded fastener.

12. The turbine engine of claim 9, wherein the securement mechanism is releasable.

13. An aircraft engine, comprising:
   a rotating structure disposed proximal a forward end of the aircraft engine;
   a composite casing circumferentially surrounding the rotating structure;
   a securement ring circumferentially surrounding the rotating structure and fastened to the composite casing; and an acoustic panel comprising a plurality of acoustic panel members arranged adjacent to one another to form a substantially complete ring of the acoustic panel surrounding the rotating structure and disposed radially inside the composite casing, wherein each acoustic panel member is secured to the securement ring by a securement mechanism such that the acoustic panel is substantially circumferentially fixed relative to the composite casing, where the securement mechanism on each acoustic panel member is accessible at a forward end of the acoustic panel members for removal of the acoustic panel members.

14. The aircraft engine of claim 13, wherein the securement mechanism comprises a nutplate attached to a forward rail of the acoustic panel and further comprises a threaded fastener that extends through an aperture in the securement ring and mates with the nutplate.

15. The aircraft engine of claim 13, wherein the securement mechanism secures a forward rail of the acoustic panel to the securement ring.

16. The aircraft engine of claim 13, wherein the securement ring has a protrusion extending in an aft direction of the aircraft engine.

17. The aircraft engine of claim 16, wherein the aft protrusion is secured to the acoustic panel by the securement mechanism, wherein the securement mechanism comprises a threaded fastener disposed in a radial direction of the aircraft engine.

* * * * *

UNITED STATES PATENT AND TRADEMARK OFFICE
CERTIFICATE OF CORRECTION

PATENT NO.         : 10,473,030 B2
APPLICATION NO.    : 15/452341
DATED              : November 12, 2019
INVENTOR(S)        : Robert W. Heeter Page 1 of 1

It is certified that error appears in the above-identified patent and that said Letters Patent is hereby corrected as shown below:

In the Claims

Column 15
Line 56, please delete "there between" and insert --therebetween--.

Signed and Sealed this
Twenty-fifth Day of February, 2020

Andrei Iancu
*Director of the United States Patent and Trademark Office*